US007146415B1

(12) United States Patent
Doi

(10) Patent No.: US 7,146,415 B1
(45) Date of Patent: Dec. 5, 2006

(54) INFORMATION SOURCE MONITOR DEVICE FOR NETWORK INFORMATION, MONITORING AND DISPLAY METHOD FOR THE SAME, STORAGE MEDIUM STORING THE METHOD AS A PROGRAM, AND A COMPUTER FOR EXECUTING THE PROGRAM

(75) Inventor: Katsuo Doi, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 733 days.

(21) Appl. No.: 09/629,974

(22) Filed: Jul. 31, 2000

(30) Foreign Application Priority Data

Aug. 6, 1999 (JP) ............................... 11-224620

(51) Int. Cl.
*G06F 15/173* (2006.01)
(52) U.S. Cl. .................... 709/224; 709/203; 709/217
(58) Field of Classification Search ................ 709/200, 709/201, 232, 233, 237, 203, 224, 217; 345/739; 707/10; 715/513, 514
See application file for complete search history.

(56) References Cited

U.S. PATENT DOCUMENTS

| 6,119,078 | A  | * | 9/2000  | Kobayakawa et al. ......... 704/3 |
| 6,144,962 | A  | * | 11/2000 | Weinberg et al. ............ 707/10 |
| 6,160,552 | A  | * | 12/2000 | Wilsher et al. ............. 345/739 |
| 6,170,016 | B1 | * | 1/2001  | Nakai et al. ................ 709/232 |
| 6,182,111 | B1 | * | 1/2001  | Inohara et al. .............. 709/201 |
| 6,185,598 | B1 | * | 2/2001  | Farber et al. ............... 709/200 |
| 6,243,750 | B1 | * | 6/2001  | Verma ....................... 709/224 |
| 6,263,361 | B1 | * | 7/2001  | Hoyer et al. ................ 709/203 |
| 6,381,635 | B1 | * | 4/2002  | Hoyer et al. ................ 709/207 |
| 6,393,407 | B1 | * | 5/2002  | Middleton et al. .......... 709/224 |
| 6,393,479 | B1 | * | 5/2002  | Glommen et al. .......... 709/224 |
| 6,601,100 | B1 | * | 7/2003  | Lee et al. ................... 709/226 |
| 6,606,657 | B1 | * | 8/2003  | Zilberstein et al. ......... 709/224 |
| 6,643,696 | B1 | * | 11/2003 | Davis et al. ................ 709/224 |
| 6,785,659 | B1 | * | 8/2004  | Landsman et al. .......... 709/200 |
| 2002/0002556 | A1 | * | 1/2002 | Yoshida et al. ............. 707/102 |

FOREIGN PATENT DOCUMENTS

| JP | 9-204347 A  | 8/1997 |
| JP | 10-21134 A  | 1/1998 |
| JP | 10-143519 A | 5/1998 |
| JP | 10-207838   | 8/1998 |

(Continued)

OTHER PUBLICATIONS

Cheong et al., "Internet Agent: WebWalker", Chapter 7, Impress, ISBN-8443-4921-X, pp. 177-210.

(Continued)

*Primary Examiner*—Jeffrey Pwu
*Assistant Examiner*—Phuoc H. Nguyen
(74) *Attorney, Agent, or Firm*—Nixon & Vanderhye P.C.

(57) ABSTRACT

Updated information presenting software creates a list of information source URLs provided with the index of importance determined by the frequency of access to the referring URLs in the past, and selects an information source URL with a high index of importance by an information source URL sorting section, and obtains data from a server computer by a network file access section. A file comparing section detects whether the contents of the data have been updated, and, when a tag information change detecting section detects a new link and a changed anchor character string, an output formatting section creates output HTML which displays the new link and the changed anchor character string together with the information source URLs in order of the index of importance and supplies the output HTML to a browser.

22 Claims, 20 Drawing Sheets

FOREIGN PATENT DOCUMENTS

JP      10-222415 A     8/1998
JP      2000-227886     8/2000

OTHER PUBLICATIONS

Journal of Nikkei Internet Technology, May 1999, pp. 82-89.
Internet Magazine, Jun. 1999, p. 249.
Japanese Office Actions both mailed Dec. 15, 2004 (w/English translations thereof).
Yoshihito Tsuji, Recommendation of WWW Log File Analysis Using Analog, Open Design, Japan, CQ Publishing, Jun. 1, 1998 vol. 5, No. 3, pp. 4-39.

* cited by examiner

F I G. 1
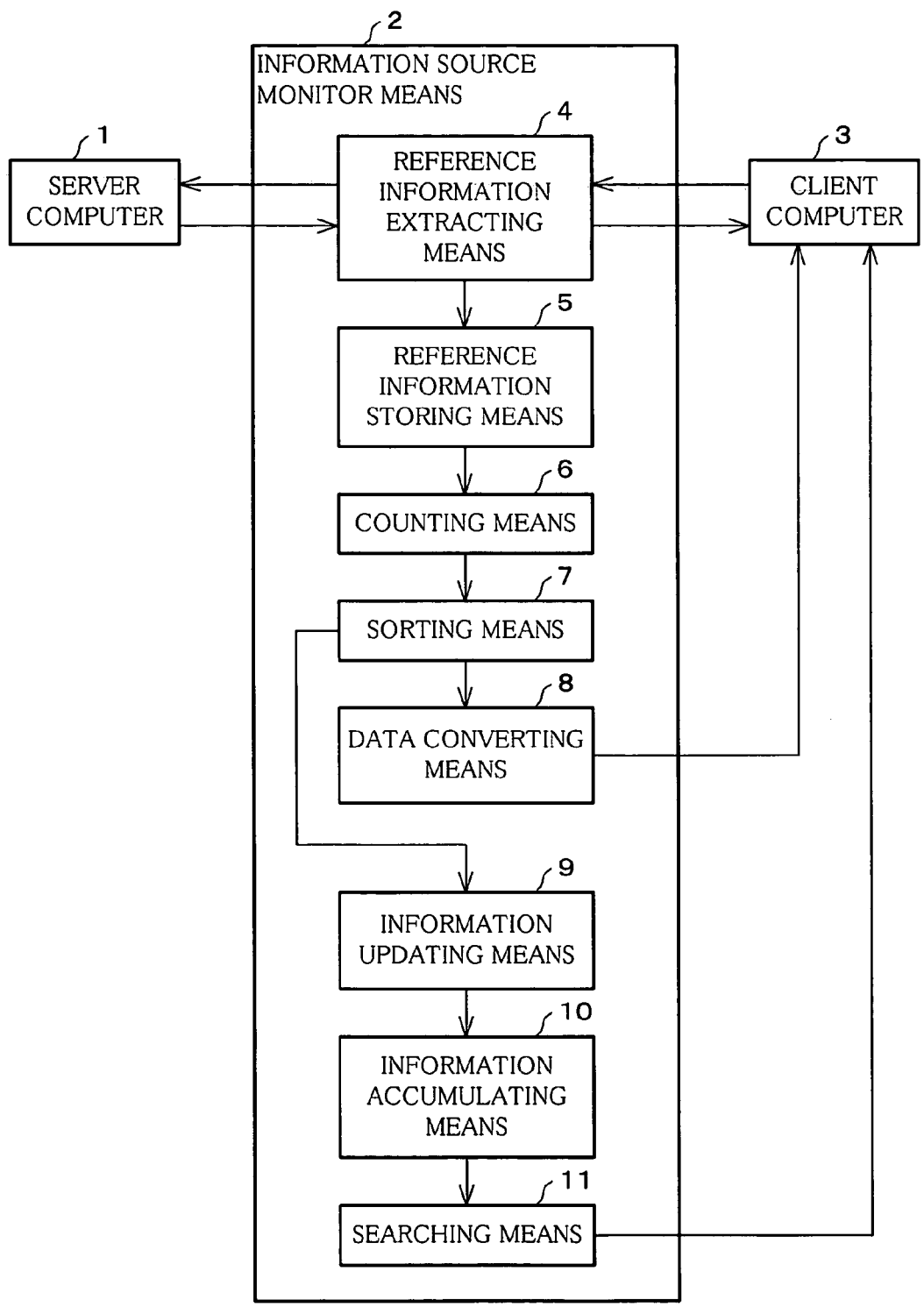

F I G. 4

```
GET http:/www.news/1.html HTTP/1.0
Referer: http://www.news
```

F I G. 5

```
HTTP/1.0 200 Document Follows
Date: Fri,23 Oct 1998 004:23:34 GMT
Content-Type: text/html
(Blank)
Text Data (HTML Data) Body
```

F I G. 7

YOUR INFORMATION SOURCE LIST

Updated at 18:30, OCT. 27, 1998 text/html Type Information Source

| Order | URL | Title |
|---|---|---|
| 1 | http://www.news/ | Daily Newspaper |
| 2 | http://www.hello.nara/ | Nara Prefecture Local Information |
| 3 | http://www.cnn.com/ | CNN Interactive |
| 4 | http://www.asahi.com/ | Asahi Newspaper News |

Moving Image (Movie) Type Information Source

| Order | URL | Title |
|---|---|---|
| 1 | http://www.hello.nara/ | Nara Prefecture Local Information |
| 2 | http://www.movie.archive/ | Movie Archive |

F I G. 1 0
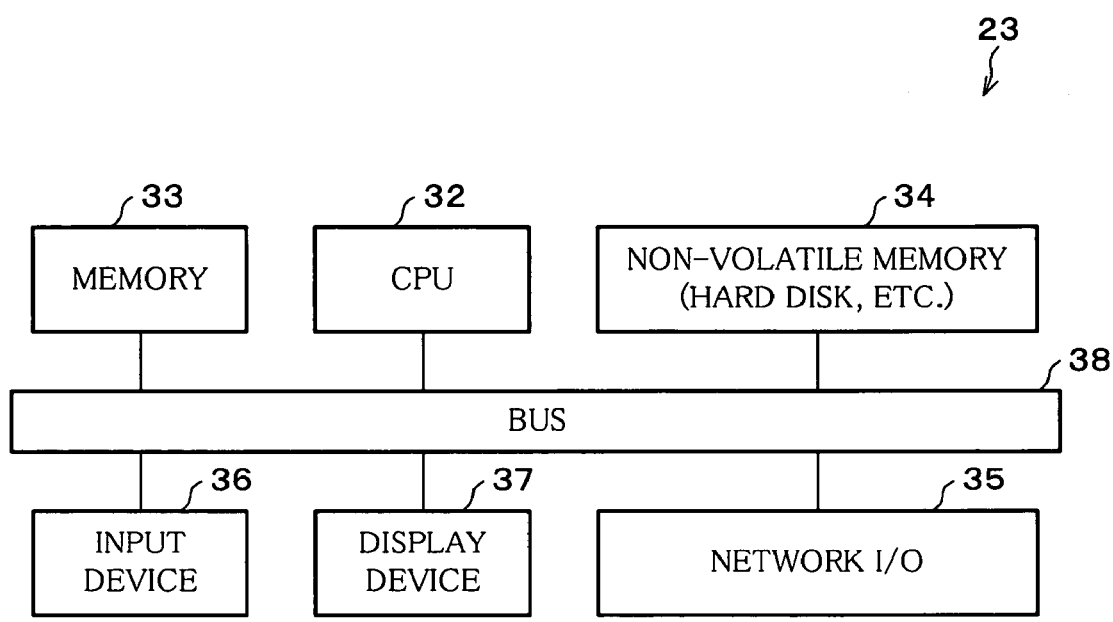

EXAMPLE OF HYPERTEXT AND HYPERLINK STRUCTURE ON PREVIOUS ACCESS OF FEBRUARY 23

FIG. 12
EXAMPLE OF HYPERTEXT AND HYPERLINK STRUCTURE ON THIS ACCESS OF FEBRUARY 24
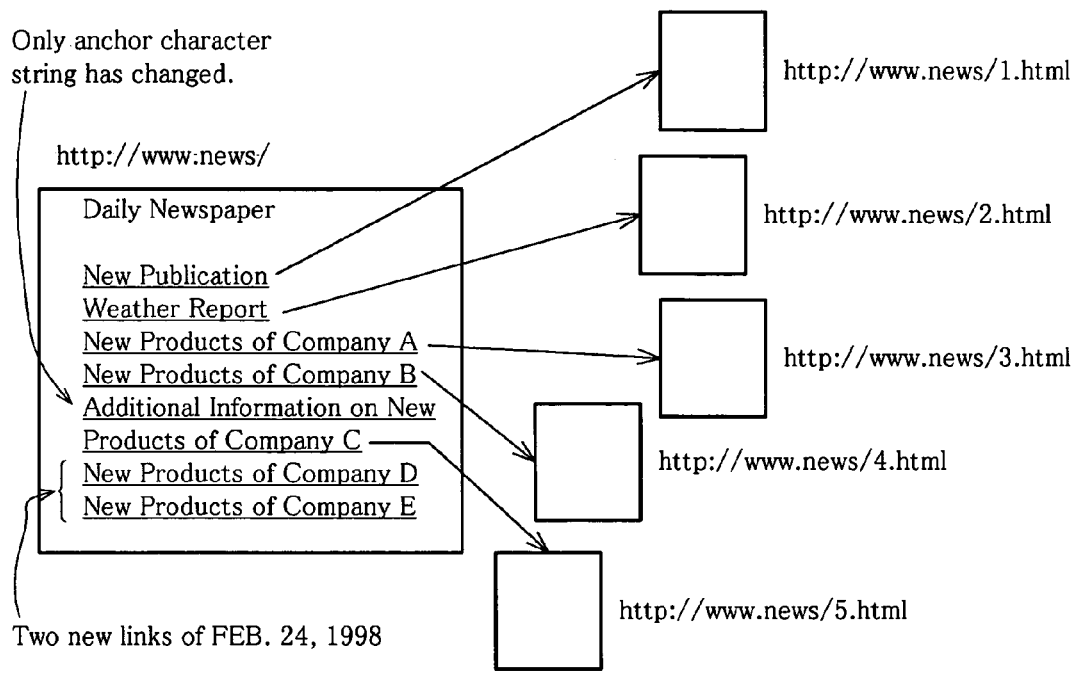
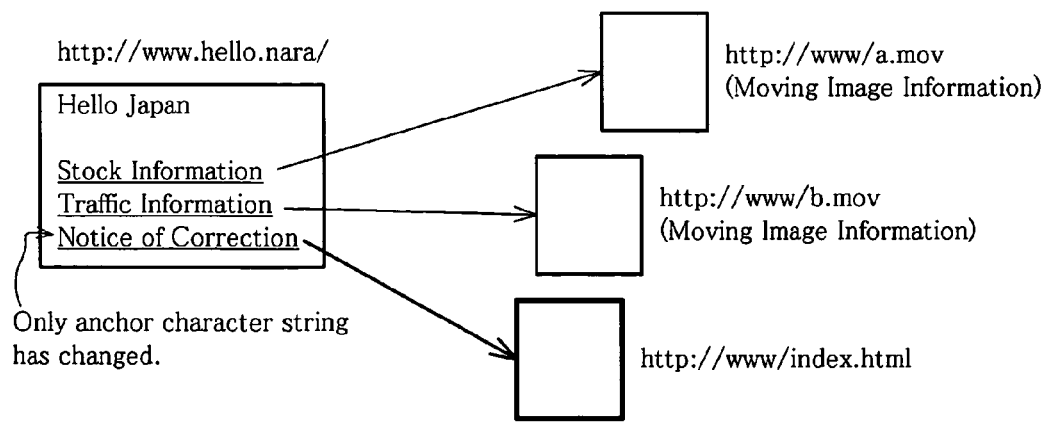

FIG. 13

EXAMPLE OF DATA STRUCTURE OF
INFORMATION SOURCE URL LIST

41

| Information Source URL[I] | Index of Importance (Referred Frequency) |
|---|---|
| http://www.news/ | 5 |
| http://web.sharp/ | 3 |
| http://www.hello.nara/ | 3 |

FIG. 14

EXAMPLE OF REQUEST HEADER

GET/File Name HTTP/1.0

SPLIT DATABASE STRUCTURE OF CORRESPONDING URL CREATED DURING THIS ACCESS

《Corresponding to http://www.news/ structure in FIG.12》

| HTTP Header Section |  |
|---|---|
| HTTP/1.0 200 Document Follows<br>Date:Fri24 Feb 1998 04:23:34 GMT<br>Last-Modefied:Fri24 Feb 1998 01:33:00 GMT<br>Content-Length: 1120<br>Content-type:text/html | |
| Hyperlink Anchor Section (File Name, Anchor Character String) | |
| 1.html | New Publication |
| 2.html | Weather Report |
| 3.html | New Products of Company A |
| 4.html | New Products of Company B |
| 5.html | Additional Information on New Products of Company C |
| 6.html | New Products of Company D |
| 7.html | New Products of Company E |

SPLIT DATABASE STRUCTURE OF CORRESPONDING URL CREATED DURING PREVIOUS ACCESS

《Corresponding to http://www.news/ structure in FIG.11》

| HTTP Header Section | |
|---|---|
| HTTP/1.0 200 Document Follows<br>Date:Fri23 Feb 1998 04:23:34 GMT<br>Last-Modefied:Fri23 Feb 1998 01:33:00 GMT<br>Content-Length: 1034<br>Content-type:text/html | |
| Hyperlink Anchor Section (File Name, Anchor Character String) | |
| 1.html | New Publication |
| 2.html | Weather Report |
| 3.html | New Products of Company A |
| 4.html | New Products of Company B |
| 5.html | New Products of Company C |

EXAMPLE OF STRUCTURE OF NEW INFORMATION DATABASE

| Information Source URL | Index of Importance | Change | New Link and Changed Character String |
|---|---|---|---|
| http://www.news/ | 5 | true | http://www.news/5.html<br>"Additional Information of New Products of Company C"<br>http://www.news/6.html<br>"New Products of Company D"<br>http://www.news/7.html<br>"New Products of Company E" |
| http://web.sharp/ | 3 | true | None |
| http://www.hello.nara/ | 3 | true | http://www/index.html<br>"Notice of Correction" |

FIG. 19 (a)

EXAMPLE OF OUTPUT HTML 46

```
<HTML>
List of New Information of Feb. 24, 1998
<a href="http://www.news/New Information</a>
<ul>
<li><a href="http://www.news/5.html"> Additional Information of New Products of Company C</a>
<li><a href="http://www.news/6.html"> New Products of Company D</a>
<li><a href="http://www.news/7.html"> New Products of Company E</a>
<ul>
<a href=http://web.sharp/>http://web.sharp/</a> has been updated.
<a href="http://www.hello.nara.">http://www.hello.nara/ New Information</a>
<ul>
<li><a href="http://www.hello.nara/teisei.html">Notice of Correction</a>
</ul>

<HTML>
```

FIG. 19 (b)

DISPLAY RESULT OF OUTPUT HTML ON BROWSER

| New Information of Feb. 24, 1998 |
| http://www.news/New Information |
| • Additional Information of New Products of Company C |
| • New Products of Company D |
| • New Products of Company E |
| http://web.sharp/ has been updated. |
| http://www.hello.nara/New Information |
| • Notice of Correction |

In order of index of importance

F I G. 20

DISPLAY RESULT ON BROWSER WHEN THERE IS UPPER LIMIT
ON THE NUMBER OF DETECTION RESULTS TO BE DISPLAYED

```
New Information of Feb. 24, 1998
http://www.news/New Information
 •    Additional Information of New Products of Company C
 •    New Products of Company D
There is one more new link.
http://web.sharp/ has been updated.
http://www.hello.nara/New Information
 •    Notice of Correction
```

EXAMPLE OF BANNER ADVERTISEMENT IN HTML DOCUMENT

```
<a href="
http://ad.banner/user=1234&domain=jp &resource=http://www.hogehoge/
1234/ &userid=nara996789 &TS=13243141.">
<img src=http://ad.banner/banner.gif></a>
<p>
Nara Prefecture Local Information
```

DISPLAY EXAMPLE OF THE HTML ON BROWSER

Nara Prefecture Local Information nn# INFORMATION SOURCE MONITOR DEVICE FOR NETWORK INFORMATION, MONITORING AND DISPLAY METHOD FOR THE SAME, STORAGE MEDIUM STORING THE METHOD AS A PROGRAM, AND A COMPUTER FOR EXECUTING THE PROGRAM

FIELD OF THE INVENTION

The present invention relates to an information source monitor device for network information, which is used in a system including, for example, server computers and client computers interconnected by a network and selectively displays the addresses of proposed access points when browsing a file object having a hyperlink structure on the server computer through the client computer, and also relates to a monitoring and display method for the same, a storage medium storing the method as a program, and a computer for executing the program.

BACKGROUND OF THE INVENTION

Nowadays, there have been widely used systems in which a plurality of server computers and a plurality of client computers are interconnected by a network, multimedia data having a hypertext structure is stored in each server computer, and such hypertext can be read on each client computer with software called a browser. An example of such systems is a system called the WWW (World Wide Web) on the Internet.

Documents containing multimedia data (hereinafter referred to as the "hypertext") are described in, for example, a description language called HTML (Hypertext Markup Language), and can include application programs such as text documents, still images, moving images, music data and a Java® APPLET. A unique address called URL (Uniform Resource Locator) is allotted to such hypertext. A user can access a desired hypertext by specifying a URL through a browser. Moreover, a hyperlink (hereinafter referred to as the "link") for accessing other page and multimedia data is embedded in hypertext. By pointing this link on the browser, the user can move to the linked hypertext.

A lot of tag information indicative of the characters and attributes of data is defined in the HTML. As an example of the tag, there is a format <a href="URL">anchor character string</a> indicating a link. This format can specify the address of a linked point by a URL by starting with <a> and closing with </a>. By pointing such an anchor character string to which a link is attached on the browser, hypertext at the URL can be read.

Regarding the browsers as HTML display software for the client computers, for example, products such as Netscape Communicator® available from Netscape Communications Corp. and Internet Explorer® available from Microsoft have been widely used and operated on computers in which various operation systems are installed. With these browsers, it is possible to store the name of the URL of the accessed hypertext, the accessed date and time, and the title indicative of the contents of the URL on the hard disk in the client computer. This information will be presented as the "History" to the user for reuse.

The number of pages of hypertext has been increasing exponentially worldwide, and the user usually registers the URLs of important hypertext among those once read in a so-called Bookmarks file in the browser by using the above-mentioned History. Specifically, the bookmarks selectively display the proposed accesses points. When the user wants to access hypertext which has been accessed in the past again, he/she can access desired hypertext easily by referring to the bookmarks.

However, the number of URLs recorded in the Bookmarks file has been increasing, and the Bookmarks file is flooded with URLs in which the user is no longer interested, unnecessary URLs and URLs which are no longer exist with the passage of time. Therefore, the user has to carry out an increasing number of time-consuming works to keep only the URLs in which the user is interested in the Bookmarks file and confirm with eyes whether each hypertext contain new information by visiting the remaining URLs.

Then, for instance, in the browser "Netscape Navigator®" of Netscape Communications Corp., whether the URLs recorded in the Bookmarks file have been changed is automatically inspected by comparing with the previous accessed date, and a URL where the information has been updated will be presented with a check mark to the user. Thus, the user can readily know the URLs containing a change. However, the contents and location of the change at the URL are not displayed. Hence, when a large number of URLs in the Bookmarks file have been changed, it is necessary to access all of these URLs and see the state of the changes with eyes for confirmation.

In order to make an improvement in such a circumstance, there is new link detection agent software which automatically monitors hypertext to detect and display the state of changes. As known examples, agent software capable of detecting new links of hypertext is disclosed in "Internet Agent" (Far-Chun Cheong, translated by Hiroyuki Ohno, sold by Impress Corporation, ISBN-8443-4921-X), Chapter 7 "WebWalker: Your Web Maintenance Robot". In addition, there is other commercially available software, such as WebWhatsNew® of AI Soft K.K. in Japan. Furthermore, Japanese laid-open patent publication (Tokukaihei) No. 10-222415 (published date: Aug. 21, 1998) discloses a similar technique.

Such new link detection agent software includes a database of a collection of links of a certain URL for each URL, compares the links with the links in the previous access when performing access, detects a new link or a change in the anchor character string to which a link is attached, and presents the result to the user. In this case, the URLs to be monitored are those in the user's Bookmarks file or those manually specified by the user.

Regarding the above-mentioned tag, it is possible to use a self-defined extended tag such as XML (Extensible Markup Language). For instance, in the file object "http://www.sharp.co.jp/mebius.html", if the <price> tags, i.e., <price>200,000yen</price>, are self-defined and interpreted that the anchor character string (200,000yen) enclosed by the <price> tags represents the price of the product, it is possible to create agent software which automatically confirms whether the price is lowered from a change in the anchor character string. This is disclosed, for example, in the article "Application of XML to business has started" on the magazine "Nikkei Internet Technology" (the May 1999 issue, p 82–89).

However, in a method of noticing the appearance of a new link and an update of hypertext containing a change in the anchor character string by the above-mentioned new link detection agent software, the URLs subjected to monitoring are fixed, for example, those in the Bookmarks file, and the user needs to clearly specify the URLs. Therefore, when a number of URLs recorded in the Bookmarks file are monitored with the use of the bookmark as the source of the URLs subjected to monitoring, there is a possibility that too many URLs are monitored and URLs which were helpful for the user in the past but are no longer necessary are monitored. Thus, it takes a long time to monitor the update of hypertext, and the results of monitoring contain a lot of unnecessary information.

To reduce the number of URLs subjected monitoring, some methods have been implemented or proposed as described below. For instance, in the Netscape Communicator, the URLs of hypertext accessed in the past can be sorted according to the frequency in use or the date and time, and then displayed. Moreover, for example, Japanese laid-open publication (Tokukaihei) No. 10-143519 discloses a method and device which sort the URLs accessed in the past according to the frequency in use or the time of reading and listening, and display the results.

Besides, for example, Japanese laid-open publication (Tokukaihei) No. 9-204347 (published date: Aug. 5, 1997) and No. 10-21134 (published date: Jan. 23, 1998) disclose methods of updating a cache. In these methods, when a relay cache is incorporated into a gateway computer which relays URLs between the server computers and the client computers, the frequency the URLs relayed in the past is calculated and a list is created, and the gateway computer voluntarily updates the cache in order of the frequency.

A common feature between these systems is that these systems pay attention to the frequency the URLs of hypertext accessed in the past, calculate the frequency by statistical processing, and judge that hypertext which was accessed frequently is highly important to the user.

Here, suppose a system formed by a plurality of server computers providing information, a gateway computer and client computers. The gateway computer is a computer for interconnecting different networks/systems.

For instance, as shown in FIG. 21, suppose an HTML page of the URL "http://www.news/" exists on a server computer and an HTML page of the URL "http://www.hello.nara/" exists on another server computer.

The HTML page of the URL "http://www.news/" is a page providing news information (Daily Newspaper), and provided with links to five HTML pages "New Publication ("http://www.news/1.html")", "Whether Report ("http://www.news/2.html")", "New Products of Company A ("http://www.news/3.html")", "New Products of Company B ("http://www.news/4.html")", and "New Products of Company C ("http://www.news/5.html")".

Moreover, the HTML page of the URL "http://www.hello.nara/" is a page providing Nara prefecture local information, and provided with links to two moving image data "Stock Information ("http://www/a.mov")" and "Traffic Information ("http://www/b.mov")" and to the HTML page of "Notice ("http://www/index.html")".

Here, assume that the user first accesses the HTML page of the URL "http://www.news/" through the client computer, reads the five HTML pages (text data) linked to this page, and then accesses the HTML page of the URL "http://www.hello.nara/" and reads the two moving data and one HTML page (text data) linked to this page.

At this time, the access log shown in Table 1 below is recorded in the gateway computer.

TABLE 1

| URL | Response code | Content-type | Title information |
|---|---|---|---|
| http://www.news/ | 200 | text/html | Daily Newspaper |
| http://www.news/1.html | 200 | text/html | New Publication |
| http://www.news/2.html | 200 | text/html | Whether Report |
| http://www.news/3.html | 200 | text/html | New Products of A Company |
| http://www.news/4.html | 200 | text/html | New Products of B Company |
| http://www.news/5.html | 200 | text/html | New Products of C Company |
| http://www.hello.nara/ | 200 | text/html | Nara Prefecture Local Information |
| http://www.a.mov | 200 | movie | Stock Information |
| http://www.b.mov | 200 | movie | Traffic Information |

In Table 1, the HTML page of the URL "http://www.news/" is counted only once for the following reason. For example, assume that the user moves from the HTML page of the URL "http://www.news/" to a linked page of New Publication ("http://www.news/1.html") to read this page, presses the Back button in the browser to return to the page of "http://www.news/", and moves to the other four linked pages in a similar manner. At this time, in the browser, a certain amount of cache (a memory for temporarily storing information for high-speed processing) is usually stored, and the data of the page "http://www.news/" is retrieved from this cache when returning to the page of "http://www.news/" from the page of "New Publication ("http://www.news/1.html")". In this case, since a request for obtaining the URL is not transmitted to the gateway computer, the HTML page of the URL "http://www.news/" appears only once in the access log of the gateway computer.

According to the results of counting shown in Table 1, since all of the URLs appear once, it is judged by the above-mentioned method of judging the degree of the user's demand from the frequency of appearance that the degree of the user's demand for each of these URLs is the same. However, in actual fact, if the user accesses again the HTML page of the URL "http://www.news/" or the URL "http://www.hello.nara/" later and a new link is created, it is predicted that there is a high possibility that the user will perform an access operation to access the new link. At this time, it is supposed that there is almost no possibility that the user will access the already accessed URLs "http://www.news/1.html" and "http://www.news/2.html".

In other words, when each of three file objects of URLs whose hierarchical order is one level lower than a URL representing the referring address of certain hypertext is read once through links, if the degree of importance of each of the URLs of the three file objects is 1, it is the same as the degree of importance when a file object of a URL at a lower hierarchical level is read through a link from the referring address of other hypertext. However, since the total of the number of times the former hypertext have been browsed is 3, the former text is often more important than the latter hypertext.

Hence, even when an update of hypertext is detected from a selected URL as described above by the new link detection agent software, URLs which are important to the user are not sometimes detected. Moreover, if new links or changed anchor in file objects at a lower hierarchal level are detected, too many pieces of information are provided. It is therefore difficult to present the results effectively to the user and display the results within a limited information display space.

Thus, when hypertext is arranged in a multi-stage tree structure, the degree of importance of a URL is determined by calculating the frequency of access to the individual URLs of file objects at a lower hierarchical level. Hence, the degree of importance of the URLs does not reflect the true importance to the user.

In addition, hypertext may include an anchor having a link only to an image file. This is called a banner advertisement, and an example of the format in the HTML and a display example by a HTML browser are shown in FIGS. 22(a) and 22(b), respectively. In these examples, an advertisement link is attached to the advertisement image file "http://ad.banner/banner.gif". This banner advertisement has different anchor URLs for the respective accesses, and is sometimes detected as a new link by the above-mentioned update detection method of hypertext. Consequently, hypertext in which only the banner advertisement has changed is also detected as the updated hypertext and hence the unnecessary information provided to the user increases.

In order to distinguish a banner advertisement so as to exclude the banner advertisement from the objects of detection, for example, there is a method as introduced in the Internet magazine (published by Impress Corporation, June 1999 issue, p. 249) in which an image file having a domain different from a server computer to which hypertext including an embedded advertisement image belongs is searched out by Web server access software called the WebBooster Ninja (trade name) of i4 Corporation. In this method, however, it is impossible to distinguish the image file of the banner advertisement belonging to the same server computer as that of hypertext in which the advertisement image is embedded.

SUMMARY OF THE INVENTION

An object of the present invention is to provide an information source monitor device for network information capable of more precisely selecting addresses that are important to the user, efficiently detecting updates and addition of hypertext and displaying the information in order of importance to the user, a monitoring and displaying method for the same, a storage medium storing the method as a program, and a computer for executing the program.

In order to achieve the above object, an information source monitor device of the present invention is an information source monitor device for use in browsing data files having a hyperlink structure on server computers interconnected by a network through a client computer, and characterized by including reference information storing means for storing a referring URL that referred to a data file accessed by the client computer as reference information, and counting means for counting the reference information to find a total number of times reference was made to each referring URL.

According to this structure, since the referring URLs that referred to data files accessed by the client computer are stored as the reference information by the reference information storing means and the reference information is counted to find a total number of times reference was made to each referring URL, it is possible to know URLs that are used frequently as referring information. In other words, it is possible to precisely present useful URLs to the user.

In order to achieve the above object, an information source monitoring method of the present invention is an information source monitoring method for use in browsing data files having a hyperlink structure on server computers interconnected by a network through a client computer, and characterized by including the step of storing a referring URL that referred to a data file accessed by the client computer as reference information, and the step of counting the reference information to find a total number of times reference was made to each referring URL.

According to this method, the referring URLs of the data files accessed by the client computer are stored as the reference information, and the reference information is counted to find a total number of times reference was made to each referring URL. It is therefore possible to know URLs that are frequency used as the referring information. In other words, it is possible to precisely present useful URLs to the user.

In order to achieve the above object, a storage medium having a recorded program for executing monitoring of an information source according to the present invention is a storage medium having thereon a recorded program for executing monitoring of an information source when browsing data files having a hyperlink structure on server computers interconnected by a network through a client computer, and characterized in that the storage medium is readable by computers and the recorded program enables a computer to store a referring URL that referred to a data file accessed by the client computer as reference information and count the reference information to find a total number of times reference was made to each referring URL.

According to this structure, since the program for storing a referring URL that referred to a data file accessed by the client computer as reference information and for counting the reference information to find a total number of times reference was made to each referring URL is recorded, it is possible to provide a program capable of letting know URLs that are used frequently as referring information. In other words, it is possible to provide a program capable of precisely presenting useful URLs to the user.

A network information display method of the present invention is a network information display method for selectively displaying the addresses of proposed access points when browsing file objects having a hyperlink structure on server computers interconnected by a network through a client computer, and characterized by allotting an index of importance to a referring address that referred to a file object accessed by the client computer according to the frequency of access to the file object, detecting whether data at the referring address has been updated from the previous access during browsing, arranging only the referring addresses of data whose update has been detected in order of the index of importance, and displaying a detection result indicating that the data has been updated together with the referring address.

According to the present invention, when a plurality of file objects accessed by the client computer are browsed through hyperlinks from a certain referring address, the index of importance of the referring address is allotted according to the frequency of access to these file objects. For instance, when each of three file objects are browsed once through the hyperlink from the referring address, 3 is given as the index of importance to the referring address. Thus, since the index of importance is allotted to the referring address that is used whenever browsing is performed instead of a file object located at a lower hierarchical level, the index reflects most precisely the degree of importance of hypertext to the user.

Then, in the next browsing, it is judged whether the data at the referring address has been updated from the data obtained by the previous access. Since the data obtained by the access to the referring address usually includes a hyperlink to a file object located at a lower hierarchical level, it is possible to know the appearance of a new hyperlink or a modification of the anchor character string. When updates of data at the referring addresses are detected, only the referring addresses of the updated data are displayed in order of the index of importance defined as described above together with the update detection results. Thus, the contents of display are limited to those that are important to the user, and the possibility of including unnecessary information in the update detection results is lowered. Hence, it is possible to more precisely select addresses that are important to the user and efficiently display the update detection results.

Besides, when the detection results are transmitted by an electronic mail to a small-sized mobile terminal such as a cellular phone, since the number of characters in the text of the mail is usually limited, the present invention provides an advantage that the receiver of the mail can browse only a new link and a modified anchor character string at the most important address. Furthermore, if the detection results are arranged to be automatically downloaded by the use of hyperlink pre-fetching software, the information of high importance can be preferentially obtained within a limited connect time to the network. Thus, this method is useful for a mobile computer.

In order to achieve the above object, a storage medium of the present invention is characterized by storing the above-mentioned network information display method as a computer readable program.

According to the present invention, since the network information display method is stored as a computer readable program by a storage medium. Hence, this network information display method is provided on the assumption that the method is executed by a computer, and serves for general purpose.

In order to achieve the above object, a computer of the present invention is characterized by reading the program from the storage medium and executing the program.

According to the present invention, since a system for reading the program of the network information display method from the storage medium and executing the program is constructed, it is possible to select addresses that are important to the user more precisely, detect and display updates of hypertext efficiently.

For a fuller understanding of the nature and advantages of the invention, reference should be made to the ensuing detailed description taken in conjunction with the accompanying drawings.

BRIEF DESCRIPTION OF THE DRAWINGS

FIG. 1 is a block diagram showing a schematic structure of information source monitor means according to one embodiment of the present invention, and the relationship between the information source monitor means and a server computer and a client computer connected to the information source monitor means.

FIG. 4 is an explanatory view showing an example of a request header issued by the client computer.

FIG. 5 is an explanatory view showing an example of a response header issued by the server computer.

FIG. 7 is an explanatory view showing an example of the display of data generated by data converting means of the information source monitor means.

FIG. 10 is a block diagram showing the structure of a client computer in the computer network system of FIG. 9.

FIG. 12 is an explanatory view showing an example of hypertext updated from the state shown in FIG. 11 and a hyperlink structure.

FIG. 13 is an explanatory view showing an example of the data structure of an information source URL list.

FIG. 14 is an explanatory view showing an example of a request header issued by the client computer.

FIG. 16 is an explanatory view showing an example of the structure of a split database derived from the URL database shown in FIG. 15.

FIG. 17 is an explanatory view showing an example of the structure of a split database obtained during the previous access.

FIG. 18 is an explanatory view showing an example of the structure of a new information database.

FIG. 19(a) is an explanatory view showing an example of an output HTML.

FIG. 19(b) is an explanatory view showing the results of display on a browser of FIG. 19(a).

FIG. 20 is an explanatory view showing the results of display in the browser where there is an upper limit on the number of detection results to be displayed.

DESCRIPTION OF THE PREFERRED EMBODIMENTS

Embodiment 1

Figure 2:
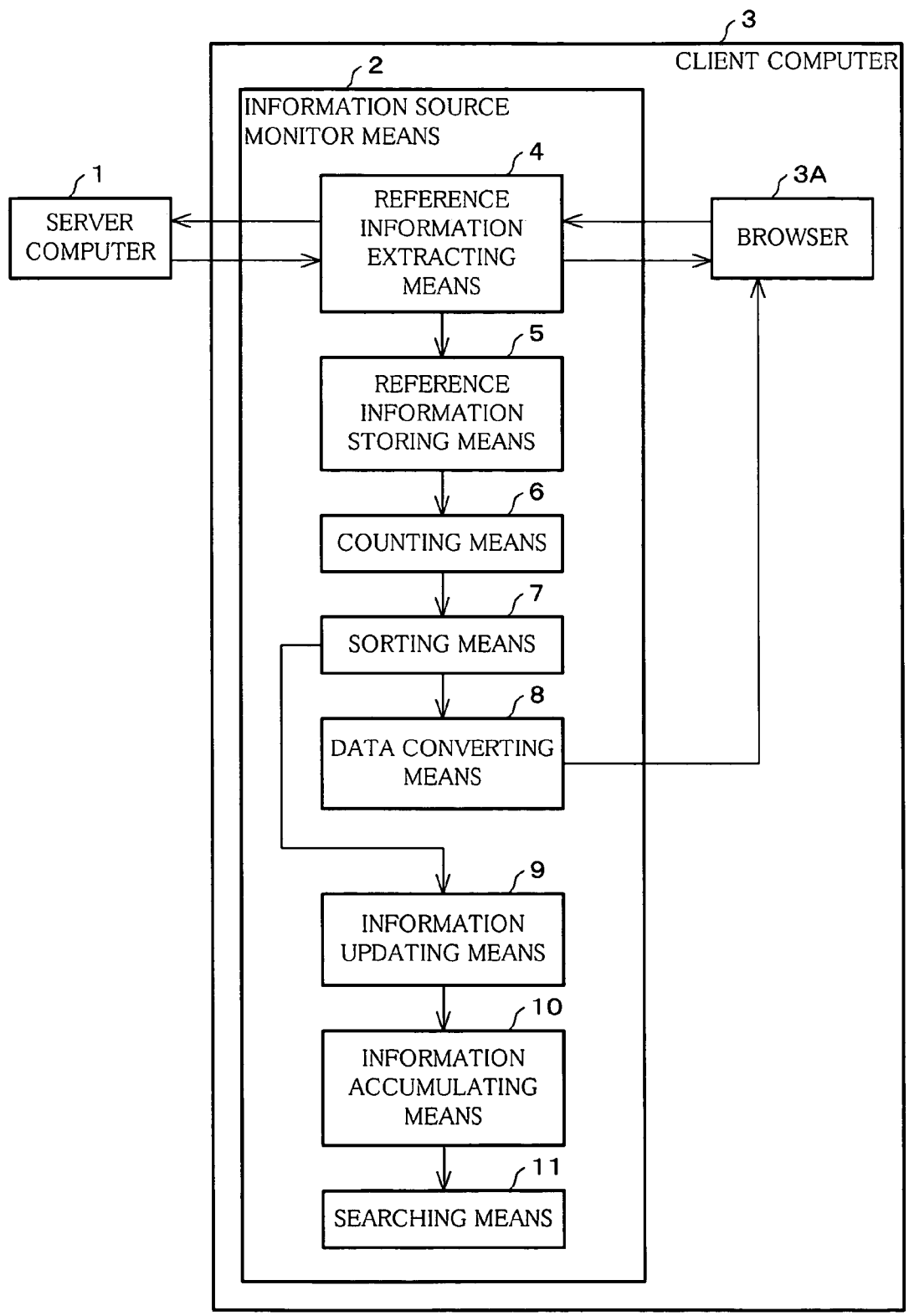
FIG. 2 is a block diagram showing a schematic structure where the information source monitor means is incorporated into the client computer.

The following description will explain one embodiment of the present invention with reference to FIG. 1 to FIG. 7.

FIG. 1 is a block diagram showing a schematic structure of a computer network system according to this embodiment. This computer network system includes a server computer 1, an information source monitor means (information source monitor device) 2, and a client computer 3. In FIG. 1, although one server computer 1 is illustrated, a legion of server computers existing on the Internet correspond to the server computer 1.

The server computer 1 stores HTML pages and various multimedia data, and manages such data and accesses from external computers by server software called, for example, a HTTP (Hypertext Transfer Protocol) daemon.

The client computer 3 includes software called a browser capable of displaying HTML pages and various multimedia data, so that the user can browse desired HTML pages and various multimedia data by operating the browser on the client computer 3.

The information source monitor means 2 may be positioned at a relay point between the server computer and the client computer. The information source monitor means 2 corresponds, for example, to a gateway computer on a firewall or a HTTP proxy server computer on the Internet, and its basic function is to relay a HTTP request and response. The information source monitor means 2 includes reference information extracting means 4, reference information storing means 5, counting means 6, sorting means 7, data converting means 8, information updating means 9, information accumulating means 10, and searching means 11. These means will be explained later.

Besides, as shown in FIG. 2, the information source monitor means 2 can be incorporated into the client computer 3. One example of a HTTP proxy server that can be incorporated into the client computer 3 is a Sharp Mobile Proxy (trade name) available from Sharp Co. Ltd.

It is also possible to construct the information source monitor means 2 as software to be a part of a browser on the client computer 3.

Figure 3:
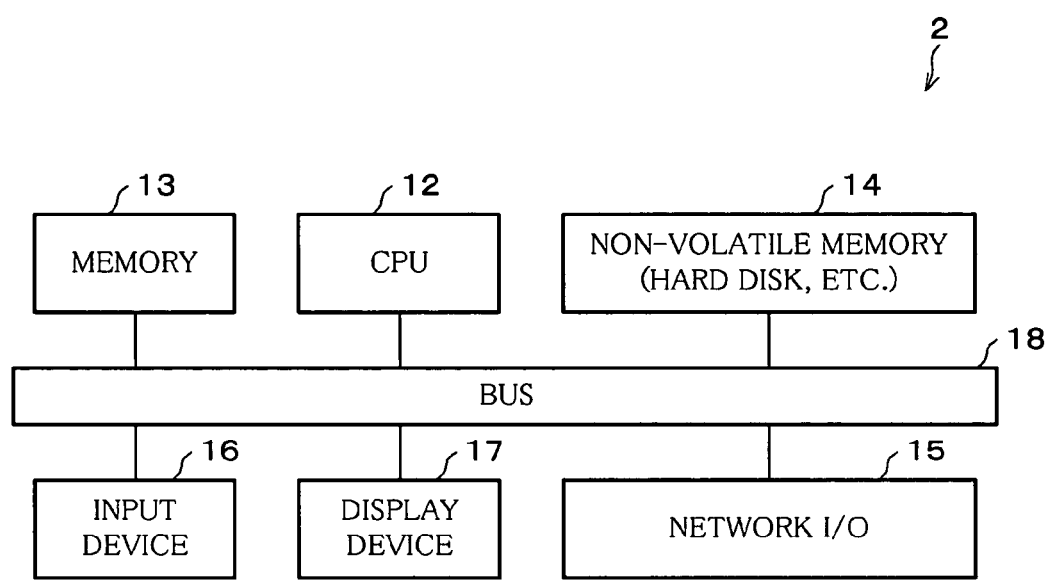
FIG. 3 is a block diagram schematically showing the components of the information source monitor means.

FIG. 3 is a block diagram showing a schematic structure of the client computer 3. As shown in FIG. 3, the client computer 3 includes a CPU (Central Processing Unit) 12, a memory 13 formed by a RAM (Random Access Memory) or the like, a non-volatile memory 14 formed by a hard disk, flush memory or the like, a network I/O (Input/Output) as an interface 15 to an external network, an input device 16 including a keyboard and a mouse, and a display device 17. These devices are connected by a bus 18. The client computer 3 with such a structure is formed by a computer generally called a personal computer.

Here, to browse HTML pages on the WWW by the browser on the client computer 3, the information source monitor means 2 will perform the operation explained below.

Figure 21:
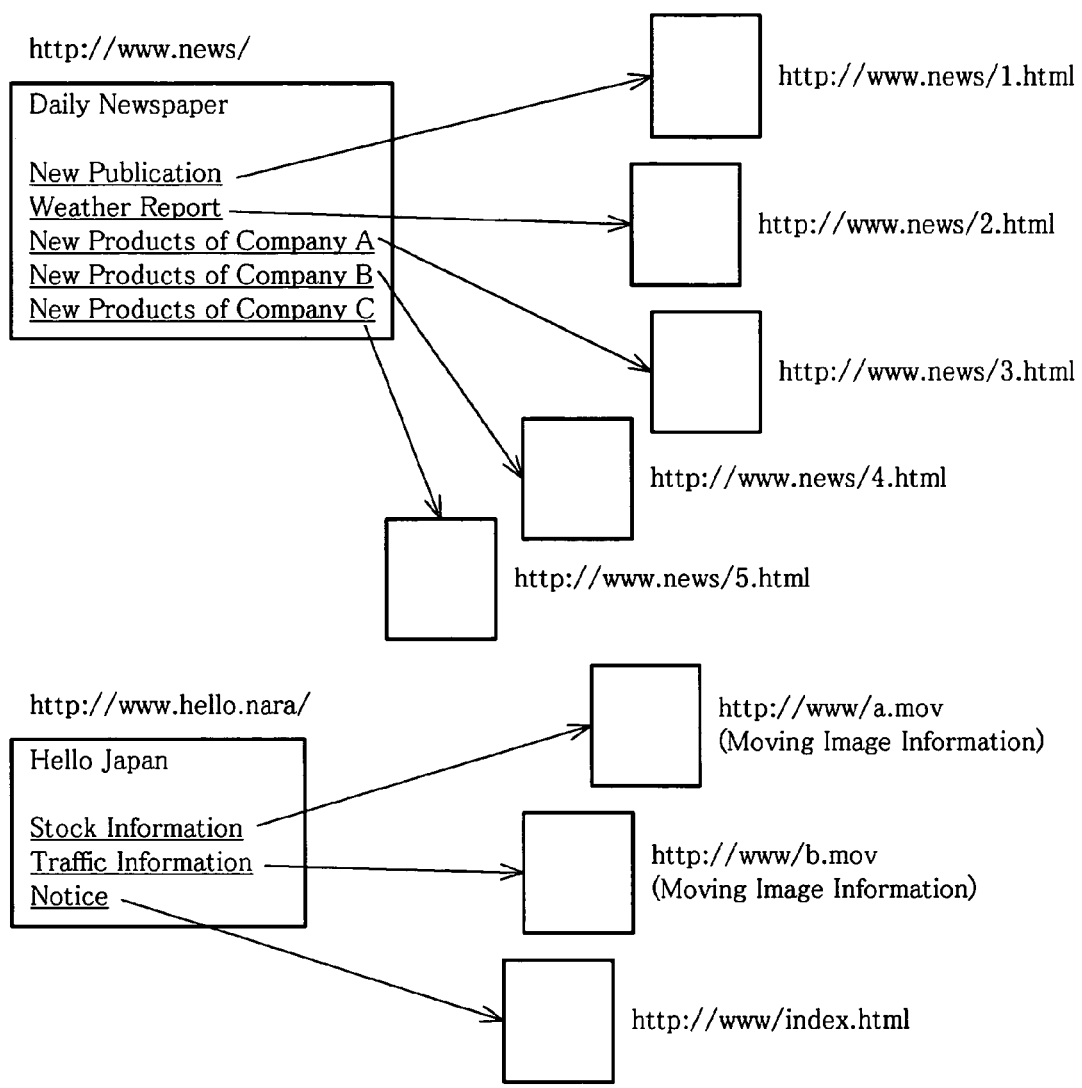
FIG. 21 is a conceptional view showing an example of the state of links between HTML pages and data files on the WWW.

First, assume that an HTML page is displayed on the browser, a user pointed a link embedded in the HTML page with a mouse cursor and clicked the mouse to access a linked URL. For instance, in the example shown in FIG. 21, an HTML page of the URL "http://www.news/" was displayed, and the user selected a link to the HTML page of "New Publication" by clicking. At this time, on the client computer 3, a connection of a TCP/IP (Transmission Control Protocal/Internet Protocol) is opened to the information source monitor means 2 through the network I/O 15, and a request header as shown in FIG. 4 is issued.

A Referrer header included in this request header is issued by the browser, and the referring information of a requested URL is indicated. In the example shown in FIG. 4, the currently requested URL "http://www.news/1.html" is requested through a link from the HTML page of the URL "http://www.news". Such a request header is a standard header according to the specifications of HTTP 1.0 The information of such a request header is defined on an assumption that it is usually recorded on a server computer.

Upon the receipt of the request header as described above, the information source monitor means 2 creates a connection to the server computer 1 for the URL "www.news", receives a corresponding file (1.html) and transfers the file to the browser of the client computer 3. At this time, the response data received by the information source monitor means 2 from the server computer 1 includes a response header and text data (HTML data) as shown in FIG. 5.

In FIG. 5, the Content-Type header in the response header indicates the multimedia type of the succeeding data, and shows that the succeeding data is text data (HTML data) in the example of FIG. 5.

The information source monitor means 2 of this embodiment uses the information contained in the request header and response header as described above to know the referring information and multimedia type of a URL which shows a normal response among the accessed URLs, and records them as the items in the access log. Therefore, for example, when the referring information on the access log is counted, referring URLs that referred to the accessed URLs can be sorted according to the frequency in use and presented as a list of information sources to the user.

Moreover, the referring information can be accumulated according to multimedia data types. For instance, it is possible to classify the referring information by data types, such as text data, moving data and music data, and present it as a list of information sources to the user.

Besides, when the information source monitor means 2 is a type of computer that stores cache, such as a HTTP proxy server computer and a gateway computer, it is possible to configure the computer such that cache is voluntarily updated for URLs of high frequency in use as the referring URLs, according to the list of information sources.

Figure 6:
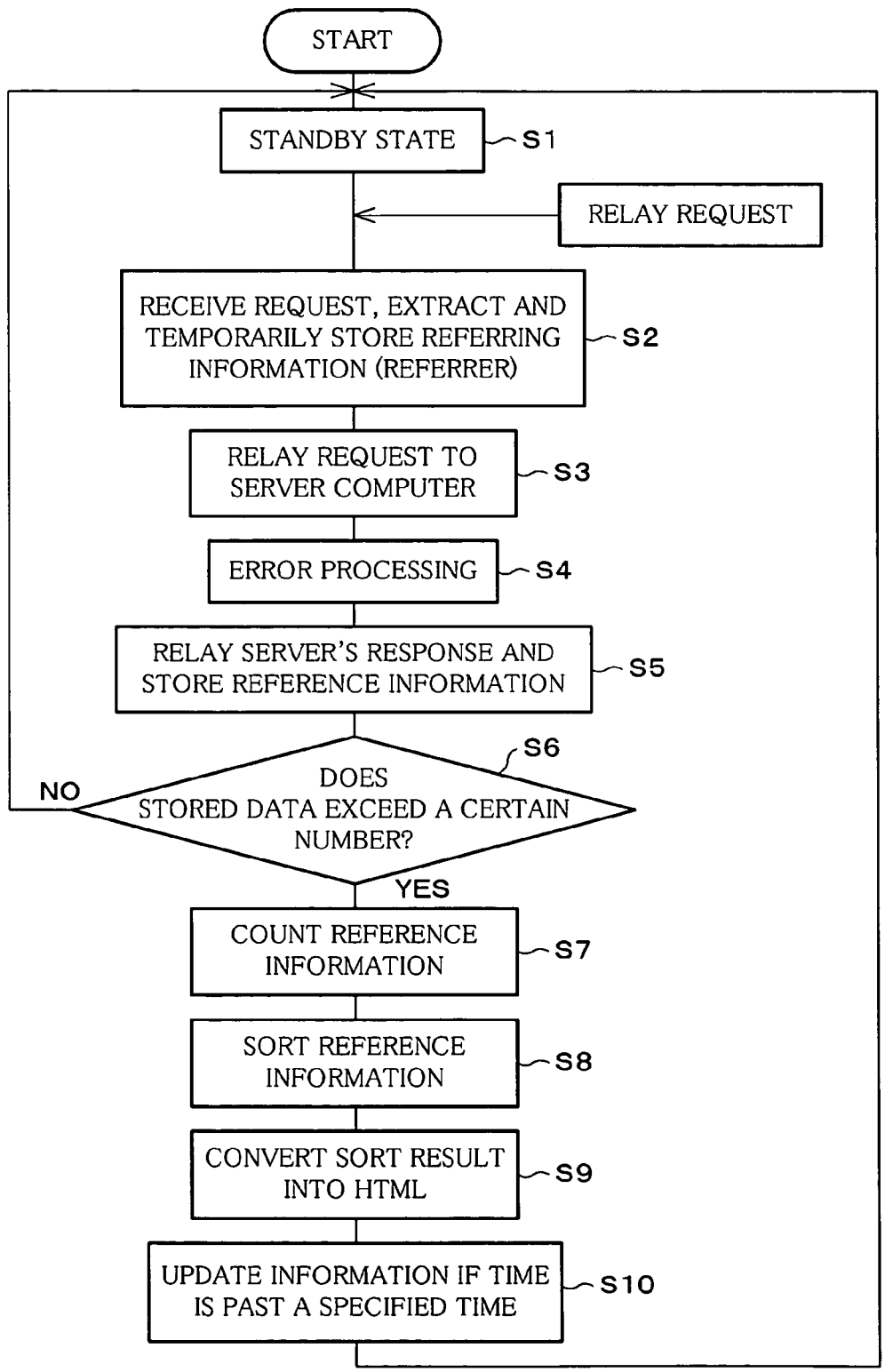
FIG. 6 is a flow chart showing a flow of processing performed by the information source monitor means.

Referring now to FIGS. 2 and 3, the flow of processing performed by the information source monitor means 2 will be explained according to the flow chart shown in FIG. 6. The following explanation is of the information source monitor means 2 incorporated into the client computer 3. However, even in a structure where the information source monitor means 2 is provided outside of the client computer 3, almost the same processing will be performed.

First, the information source monitor means 2 opens a server socket with the use of the network I/O 15 and enters into a standby state to receive a relay request (step 1, hereinafter recited as S1). When the relay request is received, the information source monitor means 2 proceeds to S2. In the case where the information source monitor means 2 is incorporated into the client computer 3 as described above, it communicates with a browser 3A via the memory 13.

Next, upon the receipt of the relay request, the information source monitor means 2 extracts the Referrer header as the referring information from the request header by the reference information extracting means 4 and temporarily stores the contents in the memory 13 (S2).

Subsequently, the information source monitor means 2 opens a connection to the server computer 1 and relays the request header (S3). At this time, if the requested URL is not present, an error message is given to the user by the display device 17 of the client computer 3, and the information of the Referrer header stored temporarily in the memory 13 is abandoned (S4).

If the requested URL is present, the response data from a server computer 1 corresponding to the URL is received, and the corresponding response data is sent to the browser 3A on the client computer 3. At the same time, the requested URL is recorded and stored as the reference information in the non-volatile memory 14 by the reference information storing means 5. The data type detected from the Content-Type header included in the response header, the referring information detected from the Referrer header, and the title of the referring information are also recorded and stored as the reference information together with the requested URL in the non-volatile memory 14 (S5). Examples of the stored data of the stored reference information are shown in Table 2.

TABLE 2

| URL | Appeared frequency | Data type | Referring information (Referrer) | Title of referring information |
|---|---|---|---|---|
| http://www.news/ | 1 | | | |
| http://www.news/1.html | 1 | text/html | http://www.news/ | Daily Newspaper |
| http://www.news/2.html | 1 | text/html | http://www.news/ | Daily Newspaper |
| http://www.news/3.html | 1 | text/html | http://www.news/ | Daily Newspaper |
| http://www.news/4.html | 1 | text/html | http://www.news/ | Daily Newspaper |
| http://www.news/5.html | 1 | text/html | http://www.news/ | Daily Newspaper |
| http://www.hello.news/ | 1 | | | |
| http://www/a.nov | 1 | movie | http://www.hello.news/ | Haze prefecture local information |
| http://www/b.nov | 1 | movie | http://www.hello.news/ | Haze prefecture local information |
| http://www/index.html | 1 | text/html | http://www.hello.news/ | Haze prefecture local information |

Here, examples of the data type of the stored data includes text/html. However, it is possible to store only a data type specified in advance. When the Content-Type header is text/html, it is possible to perform parsing of the HTML data of the response data and extract a part enclosed by the <title> tags so as to store the part as the title of the corresponding page together with the data type.

The storage of the reference information as described above is repeated until a certain number of data is stored (S6). When the number of the stored data reaches the certain number, the processing proceeds to the next step (S7).

For the certain number of the stored data, the counting means 6 counts the number of times the stored data has been used for reference for each referring information so as to produce accumulation data (S7). Then, the accumulation data is sorted according to data types by the sorting means 7 (S8). Examples of the results of sorting are shown in Tables 3 and 4. FIG. 3 shows the result of counting data of text/html or movie as data type in the example of the stored data of the reference information shown in Table 2, while Table 4 shows the result of counting only data of text/html as a data type.

TABLE 3

Result of counting data of text/html or movie as data type

| URL | Referred frequency |
|---|---|
| http://www.news/ | 5 |
| http://www.hello.nara/ | 3 |

TABLE 4

Result of counting data of only text/html as data type

| URL | Referred frequency | Title |
|---|---|---|
| http://www.news/ | 5 | Dairy Newspaper |
| http://www.hello.nara/ | 1 | Nara prefecture local information |

The data converting means 8 converts the data of the reference information thus sorted into a data format, for example, HTML data which can be displayed on the browser by the user, and the converted data is presented to the user by displaying the data as a list of information sources on the display device 17 (S9). An example of such a list of information sources is shown in FIG. 7.

Since the information indicating the title of the page of the referring information is included in the list of information sources, it is possible to know what sort of information the user of the client computer 3 used to require. In other words, the list of information sources can be used as a preference data base. For instance, it can be appreciated from the example shown in FIG. 7 that the user considers the Dairy Newspaper and Nara prefecture local information as important information sources. Moreover, since a total number of times the referring information was referenced is presented for each data type, it is possible to know the important referring information for each data type.

Here, consider a case where the information source monitor means 2 stores a certain amount of data of the accessed URLs as cache in the information accumulating means 10. In this case, the information updating means 9 voluntarily obtains information from the server computer 1 according to the sorted reference information data and updates the data stored in the information accumulating means 10 at predetermined time intervals (S10). Such an update of information is performed for the sorted reference information data, according, for example, to the frequency in use with the most frequently used referring information among the information of all the data types first or with the most frequently used referring information among the information of a data type specified by the user first.

In the updating of information by the information updating means 9, when file objects are automatically collected from a group of URLs shown in the list of information sources at link level 2 or higher levels, the data linked with the referring URL, i.e., the data the user has a high possibility to access is automatically accumulated in the information accumulating means 10. More specifically, if this process is applied to lower link levels, a wide range of relevant information linked with the referring URL is automatically collected. Since such a collection of information is performed with a URL which is frequently used as the referring information by the user as the start point, it is possible to collect adequate information of high possibility of use by the user. Thus, even when the user accesses data linked with the referring URL, it is possible to extract the data from cache data, thereby improving the access speed and reducing the network traffic.

Moreover, as described above, it is possible to search the file objects automatically collected over a predetermined link level or higher level from the URL group shown in the list of information sources by the searching means 11 and present the result to the user. In this case, since the file objects automatically collected from the user's information sources are searched, it is possible to provide highly fresh information and the search results more suitable to the user's need, in comparison with ordinary Internet search engines.

The information source monitor means 2 repeats the steps, S1 to S10, as described above.

Hence, in the result of counting the reference information and sorting the reference information by the frequency of appearance, the URL the user has used frequently as the referring information is ranked in a high order. Therefore, if such a result of sorting is presented to the user, the user can find from his/her own information sources list the place from which the desired information can be obtained and readily obtain the information by following the links from the information sources list.

Here, in respect of the structure where the information source monitor means 2 is incorporated into the client computer 3, how the respective means of the information source monitor means 2 are configured within the client computer 3 will be explained as an example. First, a program code for performing S1 to S10 and an OS (Operating System) code capable of executing the program code are stored as files in the non-volatile memory 14 (FIG. 3). Moreover, a code for loading the OS code to the memory 13 when the power is supplied is stored in the non-volatile memory 14 such as a ROM (Read Only Memory) capable of performing mapping in a CPU address space. More specifically, the respective means of the information source monitor means 2 can be achieved when the program code and OS code stored in the non-volatile memory 14 are loaded to the memory 13 and executed by the CPU 12. Furthermore, in the case where the information source monitor means 2 is provided in an external computer different from the client computer 3, the respective means of the information source monitor means 2 can be achieved by almost the same structure as above.

Besides, in the case where the information source monitor means 2 is incorporated into information-related consumer electronics appliances, for example, an Internet compatible television set or an Internet compatible telephone set, for instance, a program code for performing processing as described above is directly stored in a non-volatile memory such as ROM and executed as the CPU reads out the program code from the ROM. Additionally, even in such information-related consumer electronics appliances, it is possible to include an OS and execute the program on the OS.

Embodiment 2

The following description will explain another embodiment of the present invention with reference to FIG. 8 to FIG. 20.

Figure 8:
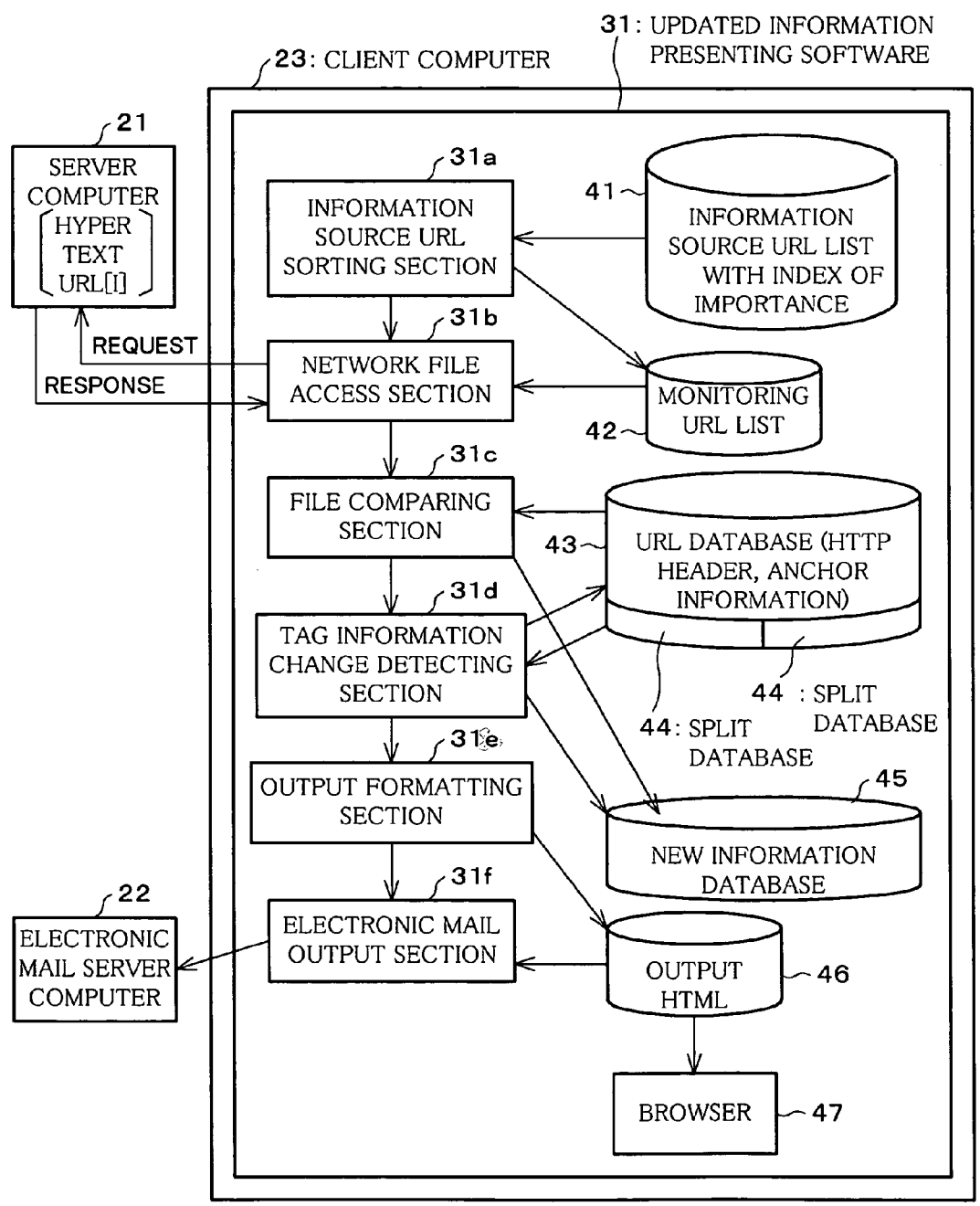
FIG. 8 is a block diagram showing a schematic structure of a computer network system according to another embodiment of the present invention, and the structure of software providing a display method for network information.

FIG. 8 is a block diagram showing a schematic structure of a computer network system according to this embodiment. This computer network system includes a server computer 21, an electronic mail server computer 22, and a client computer 23. Here, the server computer 21 and the client computer 23 are connected to each other with a network using TCP/IP as a standard protocol group on the Internet, and the client computer 23 can access a file object of the sever computer 21 through standard HTTP (Hypertext Transfer Protocol) on the Internet. Moreover, the address of the file object is specified by a URL.

The server computer 21 holds hypertext including HTML pages and various multimedia data, and manages such data and accesses from external computers by server software called, for example, HTTP daemon. Although one server computer 21 is illustrated in FIG. 8, a legion of server computers on the Internet correspond to the server computer 21. Moreover, the electronic mail server computer 22 includes an electronic mail receiving server computer and transmitting server computer which control the transmission and receiving of electronic mails, respectively, by protocols such as POP (Post Office Protocal) and SMTP (Simple Mail Transfer Protocol).

The client computer 23 includes a browser 47 which displays hypertext of the HTML format provided by the server computer 21 in the form of a normal text, so that the user can browse a desired hypertext by operating the browser 47 on the client computer 23.

FIG. 10 shows a schematic structure of hardware in the client computer 23. As shown in FIG. 10, the client computer 23 includes a CPU (Central Processing Unit) 32, a memory 33 formed by a RAM (Random Access Memory) or the like, a non-volatile memory 34 formed by a hard disk, flush memory or the like, a network I/O (Input/Output) 35 as an interface to an external network, an input device 36 including a keyboard and a mouse, and a display device 37. These devices are connected by a bus 38. The client computer 23 with such a structure is formed by a computer generally called a personal computer.

The browser 47 is stored in the non-volatile memory 34, and displays on the display device 37 hypertext fetched in the memory 33 through the network I/O 35 from the server computer 21 by manipulating the input device 36. Moreover, a network information display method according to this embodiment is stored as a program capable of being read and executed by the client computer 23 in the non-volatile memory (storage medium) 34. Thus, this network information display method is provided on the assumption that it is executed by a computer for general purpose. The structure of software composed of the program will be explained below.

This software detects updates of hypertext accessed by the client computer 23 in the past on the server computer 21, and outputs the results of detection to the browser 47 so that the results of detection are displayed in order of importance of URLs to the user on the display device 37 as shown in FIG. 19(*b*). This software will be hereinafter referred to as updated information indicating software 31. As illustrated in FIG. 8, the updated information indicating software 31 is composed of an information source URL sorting section 31*a*, a network file access section 31*b*, a file comparing section 31*c*, a tag information change detecting section 31*d*, an output formatting section 31*e*, and an electronic mail output section 31*f*.

The information source URL sorting section 31*a* sorts information source URLs by the index of importance according to an information source URL list 41 created by a method described later. Stored in the non-volatile memory 34 of the client computer 23 is the information source URL list 41 which was created by allotting the number of times each file object has been accessed in the past as an index of importance to a referring URL having links to the URL of the file object.

Figure 11:
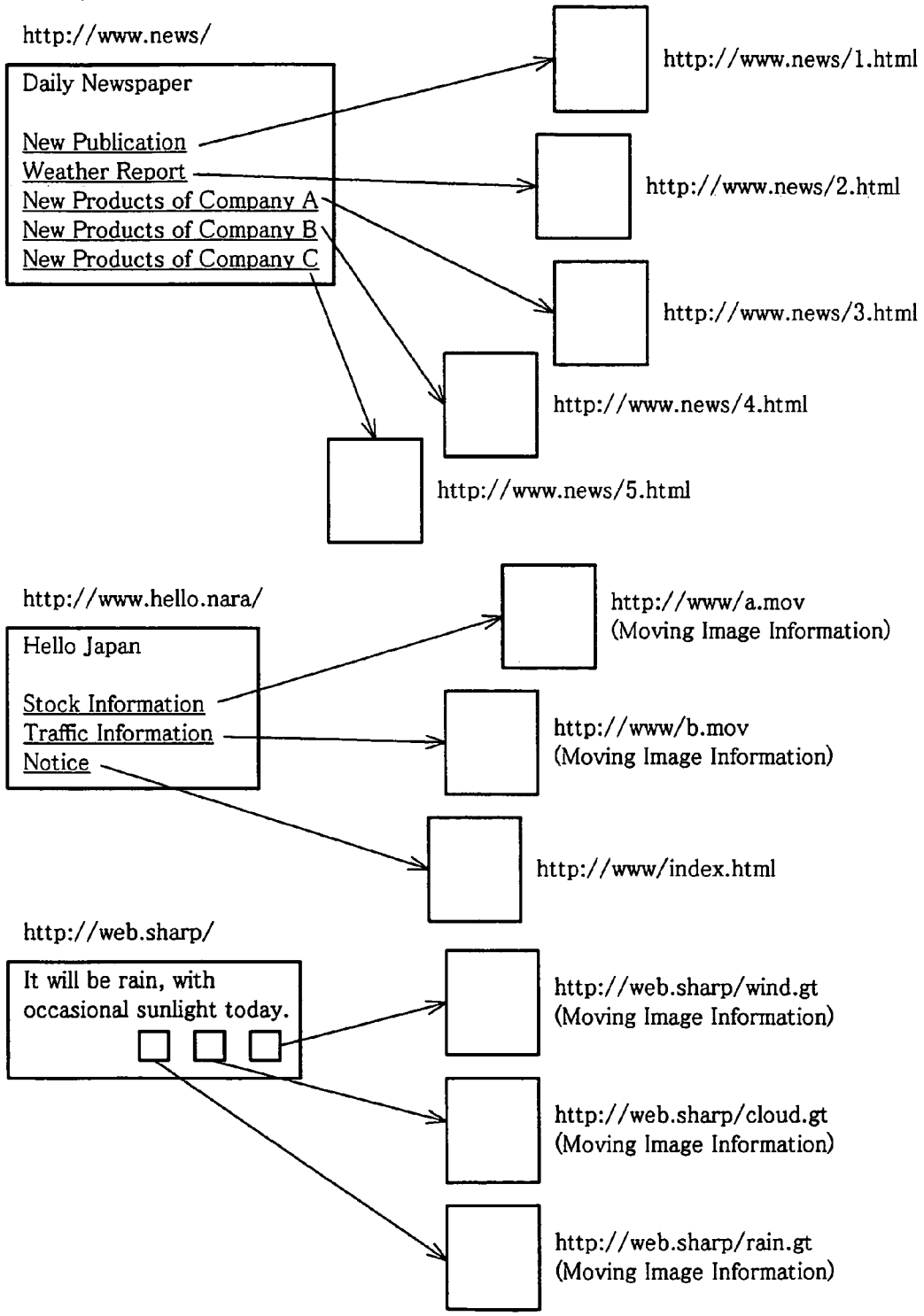
FIG. 11 is an explanatory view showing an example of hypertext previously accessed and a hyperlink structure.

For example, FIG. 11 shows that on the previous browsing date of February 23 the user accessed each of five file objects (all of them are text data in this example) of lower hierarchial order once from http://www.news/ as the referring URL of hypertext through links, accessed each of three file objects (moving image and text data) of lower hierarchial order on another server computer once from http://www.hello.nara/ as a referring URL through links, and accessed data existing at http://web.sharp/ as a referring URL three times.

At this time, suppose the total number of times the file objects of lower hierarchial order have been accessed and the number of times the data of the referring URL has been accessed indicate the frequency of access to hypertext represented by the referring URL, and the frequency of access is determined as the index of importance of the referring URL, i.e., the information source URL. Accordingly, an information source URL list 41 corresponding to FIG. 11 is created as shown in FIG. 13 and added to the previous information source list 41. Thus, in this embodiment, URLs important to the user are statistically extracted.

The index of importance of the source URL may be determined according to the browsing history of the user in a past certain period. If the certain period is set within the resent few days, it is possible to arrange only referring URLs in which the user is interested recently to be subjected to detection and the update state of the past referring URLs in which the user is no longer interested not to be informed to the user. With this arrangement, it is possible to accurately select URLs of high importance to the user who frequently changes the object of browsing with time. Moreover, the index of importance can be determined according to data types such as text data, moving data and music data.

During the next browsing, the information source URL sorting section 31a sorts the information source URLs by the index of importance with the use of the information source URL list 41 including the above-mentioned addition, and selects information source URLs from the highest index of importance according to the sort results so that the selected information source URLs do not exceed a certain number. The selected information source URLs are temporarily stored as a monitoring URL list 42 for detecting updates of hypertext together with the index of importance in the memory 33.

Figure 15:
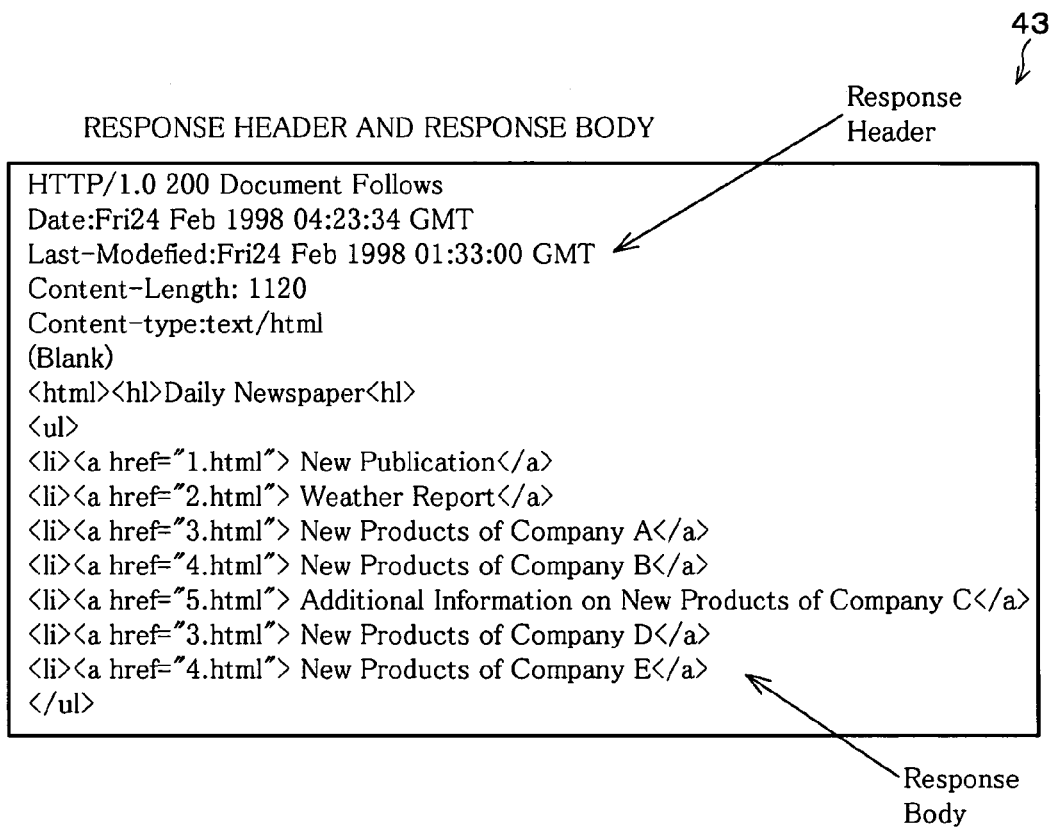
FIG. 15 is an explanatory view showing an example of the structure of a URL database.

The network file access section 31b accesses the server computer 21 for all of the monitoring URLs included in the monitoring URL list 42 according to the order of the index of importance to obtain the HTTP response header and the response body, and stores them temporarily in the memory 33. During access to a monitoring URL, the TCP/IP connection is opened to a server computer 21 indicated by the domain name section of the URL, that is, the Web server computer in this case, and a request header as shown in FIG. 14 is issued. Here, if the URL is http://www.news/index.html, the domain name section is www.news, and the file name is index.html. The response of the server computer 21 to this request consists of the HTTP response header and the response body as shown in FIG. 15. This response is temporarily stored as a URL database 43 in the memory 33.

The file comparing section 31c refers to the URL database 43 which can be searched with the monitoring URL as a key. Then, for a monitoring URL for which the URL database 43 is present, i.e., to which the server computer 21 responded, the URL database 43 is split into data composed of the HTTP header section and hyperlink anchor section as shown in FIG. 16, and temporarily stored as a split database 44 in the memory 33. Next, a split database 44' of the same URL shown in FIG. 17, which was obtained during the previous access and stored in the non-volatile memory 34, is retrieved and compared with the split database 44.

If the last file modified time described in the field "Last-Modified:" has changed or if the file size (data size) displayed as the number of bytes in the field "Content-length:" has changed by a predetermined byte as a threshold value or more, it is considered that the contents of the file of the monitoring URL have changed. Incidentally, when a change is judged from the file size, if the field "Content-length:" is not present in the HTTP response header, the file size of the monitoring URL can be self-measured and described as the "Content-length:". As a result of the comparison, if a change was found, a space for the information source URL is provided in a new information database 45 created in the memory 33 as shown in FIG. 18 and "true" is written in the change field.

The tag information change detecting section 31d compares the split database 44 and the split database 44' to detect appearance of a new anchor character string (display element), i.e., a change in the tag information relating to links indicative of whether a new link has appeared or the anchor character string (display element) has changed. If a new link or a changed anchor character string is detected, the anchor character string of the new link and the changed anchor character string are written together with their linked URL in the new information database as shown in FIG. 18 for those having the space for the information source URL provided when the new information database 45 was searched with the monitoring URL as a key. Moreover, access is made, and the URL database 43 of the monitoring URL for which the server computer 21 responded is stored in the non-volatile memory 34.

Figure 22:
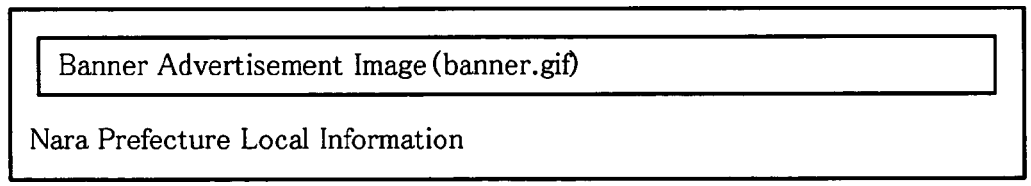
FIG. 22(a) is an explanatory view showing an example of a banner advertisement in an HTML text.
FIG. 22(b) is an explanatory view showing the results of display on a browser of FIG. 22(a).

However, if the anchor character string consists only of an image tag (for example, a HTML tag <img src=" ">) indicative of embedding of an image), the tag information change detecting section 31d judges the anchor character string is a new link only when the length of the anchor URL is not more than the variable BANLEN (=80). This is a threshold value determined by the data monitoring on the current Internet on which many URLs have a URL length exceeding 80 bytes in the banner advertisement where the URL normally changes with each access. Therefore, by arranging such that a change in the banner advertisement is not detected as a change if the contents of the monitoring URL have no change, unnecessary information to the user is reduced as much as possible. In the example of the banner advertisement shown in FIG. 22(a) for the prior art, only the <img> tag exists as the anchor enclosed by <a href=and </a> though the URL length is more than 80 bytes, and therefore it can be excluded.

The output formatting section 31e formats the contents of the new information database 45 created by the file comparing section 31c and the tag information change detecting section 31d into a file of HTML format, and supplied it as an output HTML 46 as shown in FIG. 19(a) to the browser 47. At this time, the new link and changed anchor character string respectively appeared in respect of the information sources URL are described immediately after the information source URLs with a link attached. On the other hand, when no new link and no changed anchor character string are present in the new information data base 45 and the modified field is "true", "(Information source URL) has been updated." is output.

The electronic mail output section 31f transmits the output HTML 46 which was created in the output formatting section 31e and stored beforehand in the non-volatile memory 34 to the electronic mail server computer 22. When transmitting an electronic mail, it is possible to send the electronic mail to a plurality of addresses or change the formatting method of the output HTML 46 according to the destination addresses. In the latter case, for example, an electronic mail which is directed to a small-sized portable terminal such as a cellular phone can be converted into a normal text format to contain only characters instead of the HTML format or make line feed to have a predetermined number of lines.

Figure 9:
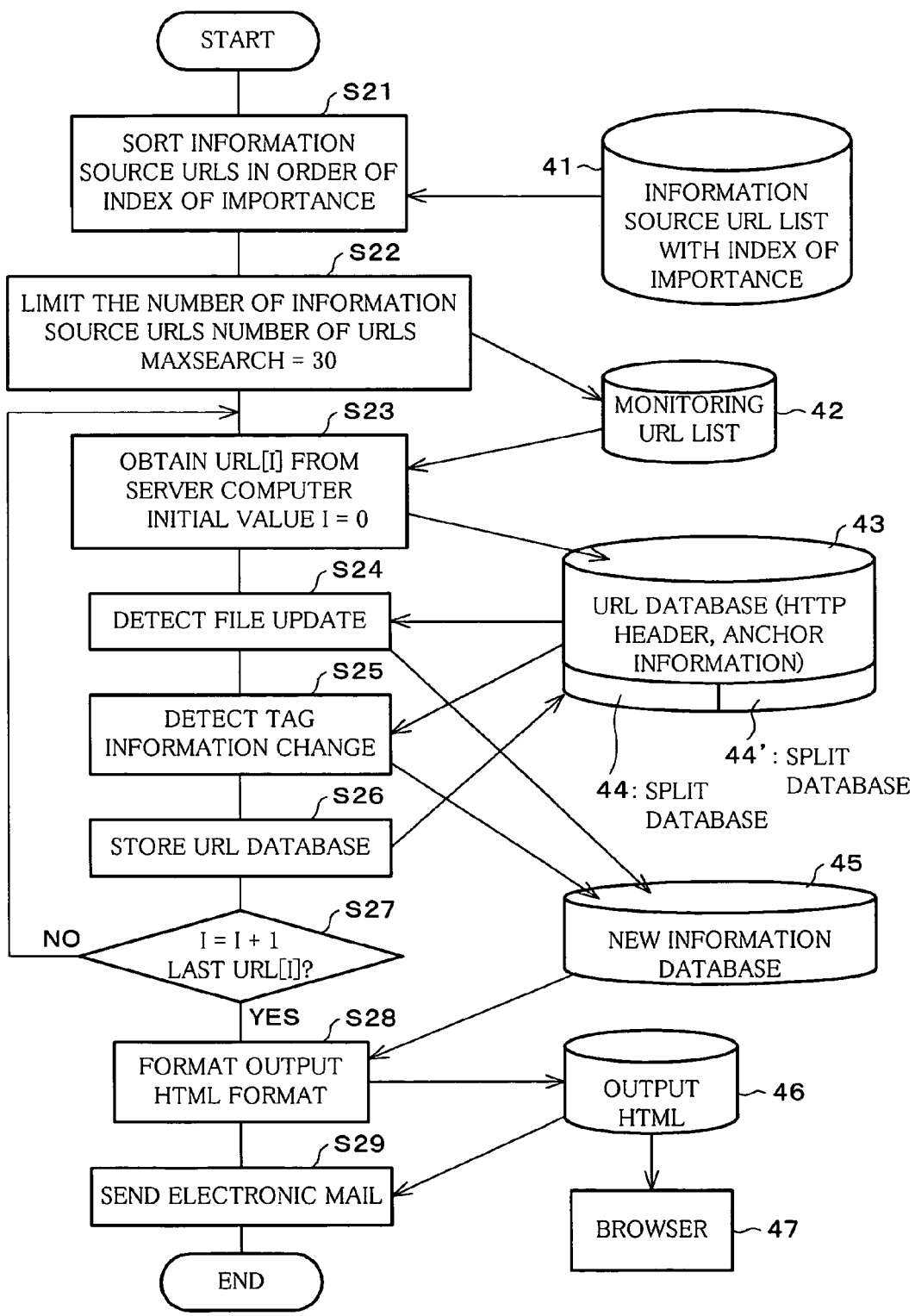
FIG. 9 is a flow chart explaining the display method for network information according to the software of FIG. 8.

Next, referring to the flow chart of FIG. 9, the following description will explain the process of presenting updated information by the updated information presenting software 31 having the above-mentioned structure.

With the activation of the browser 47 to start browsing hypertext, the updated information presenting software 31 is activated, and the information source URL list 41 is read from the non-volatile memory 34 and written in the memory 33 where the information source URLs are sorted according to the index of importance by the information source URL sorting section 31*a* in S21. This information source URL list 41 was created by the addition of three kinds of referring URLs (information source URLS) used for the accesses in the previous browsing (February 23) as shown in FIG. 11, and the index of importance of each information source URL was determined as shown in FIG. 13. Subsequently, in S22, monitoring URLs are selected from the highest index of importance by the information source URL sorting section 31*a* so that the number of the selected monitoring URLs does not exceed a certain number, MAXSEARCH (30 in this example), and the monitoring URL list 42 consisting of the selected monitoring URLs is created and temporarily stored together with the index of importance in the memory 33.

As a result of S22, suppose that the three kinds of information source URLs used in the previous browsing are selected as the monitoring URLs, and these information source URLs are represented as information source URL[I] (where I is 0, 1, 2 with the highest index of importance first) and the data of each information source URL[I] is obtained from the server computer 21. In S23, first, the network file access section 31*b* accesses http://www/news/ by making I=0 and, when the HTTP header and the response body as shown in FIG. 15 are send as the data of the information source URL[0] from the server computer 21, they are temporarily stored as the URL database 43 in the memory 33. This URL database 43 corresponds to the hyperlink structure of this browsing (February 24) as shown in FIG. 12.

Then, in S24, the URL database 43 is split into the HTTP header section and the hyperlink anchor section as shown in FIG. 16 by the file comparing section 31*c* and temporarily stored as the split database 44 in the memory 33. Furthermore, the file comparing section 31*c* writes in the memory 33 the split database 44' of the same URL shown in FIG. 17 which was obtained during the previous access and has been stored in the non-volatile memory 34, and detects whether the file content has been updated from the file content of the split data base 44.

At this time, since the last file modified time written in the "Last-Modified:" field has been changed from that in the split database 44', it can be judged that the file content of the monitoring URL has been updated. Alternatively, the same judgement can be made from a change in the file size written in the "Content-length:" field. In the case of a judgement by the file size, the file content of the monitoring URL may be judged updated only when the file size has been changed by a predetermined byte or more. Accordingly, the file of a monitoring URL where only the banner advertisement has been changed or such a small modification that the user does not need to browse the modification has been made is excluded efficiently from the objects of detection, thereby preventing the presentation of useless information. In addition, when a significant content update has been made in a portion having no hyperlink, this update can be readily recognized.

As a result of the comparison, since it is detected that the split data base 44 has been updated from the split database 44', a space for the information source URL[0] (http://www.news/) is provided in the new information data base 45 which was created in the memory 33 as shown in FIG. 18, and "true" is written in the modified field.

Subsequently, in S25, the tag information change detecting section 31*d* compares the split database 44 and the split database 44' and detects a change in the tag information relating to links. In this case, a new link to information with the URL "http://www.news/6.html" and the anchor character string "New Products of Company D" and a new link to information with the URL "http://www.news/7.html" and the anchor character string "New Products of Company E" are detected. Moreover, a new link to information which has the same URL as the previous "http://www/news5/.html but has a change in the anchor character string from "New Products of Company C" to "Additional Information on New Products of Company C" is detected.

Then, when the new information database 45 is searched for the information source URL[0] (http://www.news/) as the monitoring URL of this time, since it is appreciated that the space for the information source URL[0] is provided, the anchor character string and modified anchor string of the previously detected new link are written together with the linked URLs in the new information database 45 as shown in FIG. 18. In S26, an access is made to the server computer 21, and the URL database 43 of a monitoring URL which responded to the access is stored in the non-volatile memory 34.

Next, in S27, let I=I+1 and return to S23 to crate the new information database 45 for the information source URL[1] (http://web.sharp/) in the same manner as above. Then, the loop from S23 to S26 is repeated until I becomes the final information source URL[I], i.e., the information source URL[2] (http://www.hello.nara/) here. As a result, although a new link or a modified anchor is not detected in the information source URL[1], a change of the file size by 8 bytes (four characters) is detected. In the information source URL[2], although a new link is not detected, a modified anchor character string to "Notice of a change" from "Notice" is detected.

In S28, the new information databases 45 created for all of the information sources URL[I] as described above are formatted into files of HTML format in order of the index of importance by the output formatting section 31*e*, and supplied as the output HTML 46 as shown in FIG. 19(*a*) to the browser 47. If this output HTML 46 can be specified by, for example, c:¥myweb¥myweb.html, the display result as shown in FIG. 19(*b*) is displayed on the display device 37 by the browser 47 after the specification. In FIG. 19(*b*), when the underlined portions are pointed by a mouse or the like, the user can access the corresponding file objects. Consequently, the user can readily recognize the new link and the modified anchor character string appeared in an important referring URL and quickly access the file object.

Thus, in this embodiment, since only the referring URLs of the data updated in order of the index of importance are displayed together with the detected update results, only the contents that are important to the user are displayed, and the possibility that the update results include unnecessary information is lowered. Hence, URLs that are important to the user are precisely selected, and the update results are displayed more efficiently.

Incidentally, in formatting a database to the HTML format, when the number of the appeared new links and modified anchor character strings exceed the preset upper limit MAXLINK, the new links and modified anchor character strings are displayed in the same manner as above until the upper limit, and a message indicating the presence of new links and modified anchor character stings exceeding the MAXLINK can be displayed and a link to the detailed information about them can be attached. For instance, if MAXLINK=2, the display as shown in FIG. 20 is given by the browser 47. In FIG. 20, the message "There is one more new link" is an explanation related to the new links and modified anchor character strings exceeding the MAXLINK and a link to http://www.news/ is attached. Therefore, the details of the new links and modified anchor character strings exceeding the MAXLINK can be obtained by pointing the display with the mouse or the like. Then, even when there are too many detection results to display them in the display area on the display device 37, the user can readily confirm the detection results with eyes without oversights.

In S29, the electronic mail output section 31f sends the output HTML 46 stored beforehand in the non-volatile memory 34 to the electronic mail server computer 22. When an electronic mail is to be sent to a cellular phone, the number of characters in the text of the mail is normally limited. However, an advantage of the present invention enables the receiver of the mail to browse only the new links and modified anchor character strings of the most important source URL because the new links and modified anchor character strings are detected in order of the index of importance as described above. Moreover, the output HTML 46 can be converted into an ordinary text format to include only characters, or have line feed to include a predetermined number of lines. Consequently, the updated information can be supplied according to the limited memory and display area of a cellular phone.

Furthermore, if the detection result is arranged to be automatically downloaded by the electronic mail using link pre-fetching software, the information of high importance can be preferentially obtained within a limited connect time to the network. In this manner, the present invention is useful for a mobile computer.

The above explanation was made by referring only to the anchor tag indicating a HTML link. However, the same processing can be performed for self-defined tags used in, for example, XML. For example, when the <price> tag indicative of a price of an article is defined, if there is a page using this tag, articles whose price has been changed can be listed in order of index of importance by detecting changes in the numerals indicative of the prices surrounded by the <price> tags.

As described above, the first information source monitor device of the present invention is an information source monitor device for use in browsing data files having a hyperlink structure on server computers interconnected by a network through a client computer, and characterized by including reference information storing means for storing a referring URL that referred to a data file accessed by the client computer as reference information, and counting means for counting the reference information to find a total number of times reference was made to each referring URL.

According to this structure, since the referring URLs that referred to data files accessed by the client computer are stored as the reference information by the reference information storing means and the reference information is counted to find a total number of times reference was made to each referring URL, it is possible to know URLs that are used frequently as referring information. In other words, it is possible to precisely present useful URLs to the user.

The second information source monitor device of the present invention has the structure of the first information source monitor device, and is characterized by further including reference information extracting means for extracting information of a referring URL from a request header issued by the client computer when making access to a data file on the server computer.

According to this structure, since the reference information extracting means extracts information of a referring URL from the request header issued by the client computer and such a request header satisfies the HTTP 1.0 specification, it is possible to obtain the information of the referring URL without particularly requesting the client computer for data.

The third information source monitor device of the present invention has the structure of the second information source monitor device and is characterized in that the reference information extracting means extracts from a response header, which is issued by the server computer when a data file on the server computer was accessed through the client computer, a data type of the data file.

According to this structure, since the reference information extracting means extracts from the response header, which was issued by the server computer when the client computer accessed a data file on the server computer, a data type of the data file and such a response header satisfies the HTTP 1.0 specification, it is possible to obtain the data type of the data file without particularly requesting the client computer for data.

The fourth information source monitor device of the present invention has the structure of the third information source monitor device and is characterized by further including a sorting means for counting the reference information for each data type to find a total number of times reference was made to each referring URL.

According to this structure, since the sorting means counts the reference information for each data type to find a total number of times reference was made to each referring URL, it is possible to know URLs that are frequently used as referring information for each data type. In other words, it is possible to precisely provide useful URLs to the user according to data types.

The fifth information source monitor device of the present invention has the structure of the first information source monitor device and is characterized in that the reference information storing means stores a text belonging to a data file accessed by the client computer.

According to this structure, since the reference information storing means additionally stores the text belonging to the data file accessed by the client computer, it is possible to present the contents of preference of the user when presenting useful URLs to the user.

The sixth information source monitor device of the present invention has the structure of the first or fourth information source monitor device and is characterized by further including information accumulating means for accumulating as a cache a predetermined amount of data files accessed by the client computer, and information updating means for updating, among those in the cache, a data file of a referring URL and data files linked to the data file of the referring URL at a predetermined link level at predetermined time intervals by accessing a corresponding server computer.

According to this structure, since the information accumulating means accumulates as a cache a predetermined amount of data files accessed by the client computer and the information updating means updates, among those in the cache, a data file of a referring URL and data files linked to the data file of the referring URL at a predetermined link level at predetermined time intervals by accessing a corresponding server computer, the information is collected with a URL that is frequently used as the referring information by the user as the start point. It is thus possible to precisely collect information of high possibility of use by the user. Hence, even when the user access to data linked to the referring URL, the data can be taken out from the cached data, thereby improving the access speed and reducing the network traffic.

The seventh information source monitor device of the present invention has the structure of the sixth information source monitor device and is characterized by further including searching means for searching the data files in the cache.

According to this structure, since the searching means searches the data files in the cache, file objects collected as information based on the information source of the user are searched. It is thus possible to provide search results which present more fresh information and match the needs of the user in comparison with ordinary Internet search engines.

An information source monitoring method of the present invention is an information source monitoring method for browsing data files having a hyperlink structure on server computers interconnected by a network through a client computer, and characterized by including the step of storing a referring URL that referred to a data file accessed by the client computer as reference information, and the step of counting the reference information to find a total number of times reference was made to each referring URL.

According to this method, the referring URLs of the data files accessed by the client computer are stored as the reference information, and the reference information is counted to find a total number of times reference was made to each referring URL. It is therefore possible to know URLs that are frequently used as the referring information. In other words, it is possible to precisely present useful URLs to the user.

A storage medium having a recorded program for executing monitoring of an information source is a storage medium on which a program for executing monitoring of an information source when browsing data files having a hyperlink structure on server computers interconnected by a network through a client computer, and characterized in that the storage medium is readable by computers and includes a recorded program which enables a computer to store a referring URL that referred to a data file accessed by the client computer as reference information and count the reference information to find a total number of times reference was made to each referring URL.

According to this structure, since a program for storing a referring URL that referred to a data file accessed by the client computer as reference information and for counting the reference information to find a total number of times reference was made to each referring URL is recorded, it is possible to provide a program capable of letting know URLs that are used frequently as referring information. In other words, it is possible to provide a program capable of precisely presenting useful URLs to the user.

A first network information display method of the present invention is a network information display method for selectively displaying the addresses of proposed access points when browsing file objects having a hyperlink structure on server computers interconnected by a network through a client computer, and characterized by allotting an index of importance to a referring address that referred to a file object accessed by the client computer according to the frequency of access to the file object, detecting whether data at the referring address has been updated from the previous access during browsing, arranging only the referring addresses of data whose update has been detected in order of the index of importance, and displaying a detection result indicating that the data has been updated together with the referring address.

With the present invention, when a plurality of file objects accessed by the client computer are browsed through hyperlinks from a certain referring address, the index of importance of the referring address is allotted according to the frequency of access to these file objects. For instance, when each of three file objects are browsed once through the hyperlink from the referring address, 3 is given as the index of importance to the referring address. Thus, since the index of importance is allotted to the referring address which is used when browsing is performed instead of a file object located at a lower hierarchical level, the index reflects most precisely the degree of importance of hypertext to the user.

Then, in the next browsing, it is judged whether the data at the referring address has been updated from the data obtained by the previous access. Since the data obtained by the access to the referring address usually includes a hyperlink to a file object located at a lower hierarchical level, it is possible to know the appearance of a new hyperlink or a modification of the anchor character string. When updates of data at the referring addresses are detected, only the referring addresses of the updated data are displayed in order of the index of importance defined as described above together with the update detection results. Thus, the contents of display are limited to those that are important to the user, and the possibility of including unnecessary information in the update detection results is lowered. Hence, it is possible to more precisely select addresses that are important to the user and efficiently display the update detection results.

Besides, when the detection results are transmitted by an electronic mail to a small-sized mobile terminal such as a cellular phone, since the number of characters in the text of the mail is usually limited, the present invention provides an advantage that the receiver of the mail can browse only a new link and a modified anchor character string at the most important address. Furthermore, if the detection results are arranged to be automatically downloaded by the use of hyperlink pre-fetching software, the information of high importance can be preferentially obtained within a limited connect time to the network. Thus, this method is useful for a mobile computer.

A second network information display method of the present invention is based on the first network information display method, and characterized by detecting a new hyperlink which appeared after the previous access from the data at the referring address during browsing and displaying a display element to which the new hyperlink is attached as the detection result together with the referring address in such a state that a hyperlink is attached to a corresponding file object.

With the present invention, when the appearance of the new hyperlink in the data at the referring address is detected, the display element, for example, the anchor character string in HTML, to which the hyperlink is attached is displayed together with the referring address. Moreover, a hyperlink is attached to a corresponding file object in the display. Hence, the user can readily recognize the new hyperlink appeared at the important referring address and quickly access the file object.

A third network information display method of the present invention is based on the second network information display method, and characterized in that, only when the data of the referring address includes a portion where a hyperlink is attached only to an image file and the address of the hyperlink attached to the image file is judged no longer than a predetermined length during browsing, the hyperlink to the image file is recognized as a new hyperlink.

With the present invention, a hyperlink to a modified banner advertisement is not recognized as a new hyperlink by the use of a characteristic that an image file provided with a hyperlink whose address is longer than the predetermined length is a banner advertisement. It is thus possible to further reduce unnecessary information to the user.

A fourth network information display method of the present invention is based on any one of the first through third network information display methods, and characterized by detecting a change in the display element to which the same hyperlink as in the previous access is attached from the data at the referring address during browsing and displaying the changed display element as the detection result together with the referring address in such a state that a hyperlink is attached to a corresponding file object.

With the present invention, the same hyperlink as in the previous access is attached to the data at the referring address, and, when a change in the display element, for example, the anchor character string in HTML is detected, the changed display element is displayed together with the referring address. Moreover, a hyperlink is attached to the corresponding file object in the display. Hence, the user can readily recognize the changed display element at the important referring address and quickly access the file object.

A fifth network information display method of the present invention is based on any one of the second through fourth network information display methods, and characterized by setting the upper limit for the number of detection results to be displayed for each of the referring addresses and, when the number of the detection results exceeds the upper limit, displaying the presence of detection results exceeding the upper limit by attaching a hyperlink to the detailed display.

With the present invention, when many new hyperlinks and changed display elements are detected, all of them are not displayed, but an upper limit is set and the presence of new hyperlinks and changed display elements exceeding the upper limit is displayed. Besides, the presence of new hyperlinks and changed display elements exceeding the upper limit is also displayed by attaching a hyperlink to the detailed display. Hence, even when there are many detection results, the user can readily confirm with eyes all of them without oversights.

A sixth network information display method of the present invention is based on any one of the first through fifth network information display methods, and characterized by comparing the data size at the referring address with the data size as in the previous access during browsing and recognizing an update of the data only when the difference between the data sizes is not less than a predetermined value.

With the present invention, only when the data size at the referring address has been changed by a predetermined value or more, an update of the data at the referring address is recognized. Therefore, data at the referring address in which only the banner advertisement has been changed or such a small modification that the user does not need to browse the modification has been made can be efficiently excluded from the objects of detection, thereby preventing the presentation of useless information. Besides, when a significant content update has been made at a location having no link, such an update can be readily recognized.

A seventh network information display method of the present invention is based on any one of the first through sixth network information display methods, and characterized by determining the index of importance by the user's browsing history in a past certain period.

With the present invention, since the index of importance of a referring address is determined by the user's browsing history in the past certain period, if the latest few days are set as the certain period, only the referring addresses in which the user has been interested recently can be made the objects of detection and the updated state of the past referring addresses in which the user has no longer been interested is not informed. In this manner, it is possible to more precisely select addresses of great importance to the user who changes the objects of detection greatly with time.

Moreover, a storage medium of the present invention is characterized by storing the network information display method of any one of the first through seventh methods as a computer readable program.

With the present invention, since the network information display method is stored as a computer readable program by a storage medium. Hence, this network information display method is provided on the assumption that the method is executed by a computer, and serves for general purpose.

A computer of the present invention is characterized by reading the program from the storage medium and executing the program.

With the present invention, since a system for reading the program of the network information display method from the storage medium and executing the program is constructed, it is possible to select addresses that are important to the user more precisely, detect and display updates of hypertext efficiently.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information source monitor device for use in monitoring access of a specific client computer to an unspecified number of server computers in a network, the server computers having data files having a hyperlink structure, the specific client computer browsing the data files, and the network interconnecting the server computers and the specific client computer, the information source monitor device comprising:

extracting means for extracting a referring URL (Uniform Resource Locator) from a request header for a data file wherein the referring URL is of a higher hierarchal level than is a URL of a referred-to hyperlinked page of the request header, the request header outputted to the network from the specific client computer;

reference information storing means for storing the thus extracted referring URL of the higher hierarchal level as reference information;

counting means for counting the reference information to obtain a total number of times references made for each referring URL so that the number of references by the URL of the higher hierarchal level is counted and the number of times that a particular URL is used as a referrer to refer a client to other data file(s)/site(s) is counted; and output means for outputting a result of the counting to the specific client computer.

2. The information source monitor device as set forth in claim 1, wherein said information source monitor device is incorporated into the client computer.

3. The information source monitor device as set forth in claim 2, wherein said information source monitor device is constructed as a part of a browser in the client computer.

4. The information source monitor device as set forth in claim 1, wherein said information source monitor device is positioned at a relay point between the server computers and the client computer.

5. The information source monitor device as set forth in claim 1, further comprising reference information extracting means for extracting information of a referring URL from a request header which is issued by the client computer when the client computer accesses a data file on the server computer.

6. The information source monitor device as set forth in claim 5, wherein said reference information extracting means extracts a data type of a data file from a response header which is issued by the server computer when the client computer accessed the data file on the server computer.

7. The information source monitor device as set forth in claim 6, further comprising sorting means for counting the reference information according to data types to find a total number of times reference was made to each referring URL.

8. The information source monitor device as set forth in claim 1, further comprising data converting means for converting data of the reference information into a displayable data format.

9. The information source monitor device as set forth in claim 1, wherein said reference information storing means further storing a text belonging to a data file accessed by the client computer.

10. The information source monitor device as set forth in claim 1, further comprising:

information accumulating means for accumulating as a cache a predetermined amount of data files accessed by the client computer; and information updating means for updating data files at referring URLs and data files linked to the data files at the referring URLs at a predetermined link level in the cache at predetermined time intervals according to a counting result of the reference information by accessing a corresponding server computer.

11. The information source monitor device as set forth in claim 10, further comprising searching means for searching the data files in the cache.

12. The information source monitor device of claim 1, wherein said page is an HTML page.

13. The device of claim 1, wherein the counting means is for counting the reference information to obtain a total number of times references made for each referring URL so that a count value is increased each time a given page is used to link to another or destination linked page.

14. The information source monitor device of claim 1, wherein said reference information storing means stores at least a referring URL as reference information when the client computer makes an access to a URL of a lower hierarchical order than the referring URL, where the URL of the lower hierarchical order is hyperlinked to a page of the referring URL; and wherein said counting means is for counting a referred number of times of the referring URL stored in said reference information storing means so that a counter is incremented when a client visits a URL of a lower hierarchical order through the referring URL.

15. The information source monitor device of claim 1, wherein the referring URL is a referrer regulated by a TCP/IT protocol.

16. The information source monitor device of claim 1, wherein the referring URL is a referrer regulated by HTTP 1.0 specifications of the TCP/IT protocol.

17. An information source monitor method for use in monitoring access of a specific client computer to an unspecified number of server computers in a network, the server computers having data files having a hyperlink structure, the specific client computer browsing the data files, and the network interconnecting the server computers and the specific client computer, the method comprising the steps of:

extracting a referring URL (Uniform Resource Locator) from a request header for a data file wherein the referring URL is of a higher hierarchal level than is a URL of a referred-to hyperlinked page of the request header, the request header outputted to the network from the specific client computer;

storing the extracted referring URL of the higher hierarchal level as reference information;

counting the reference information to find a total number of times reference was made to each referring URL so that the number of references by the URL of the higher hierarchal level is counted and the number of times that a particular URL is used as a referrer to refer a client to other data file(s)/site(s) is counted;

outputting a result of the counting to the specific client computer.

18. The method of claim 17, wherein the counting is for counting the reference information to obtain a total number of times reference is made for each referring URL so that a count value is increased each time a given page is used to link to another or destination linked page.

19. The method of claim 17, further comprising:

storing at least a referring URL as reference information, when the client computer makes an access to a URL of a lower hierarchical order than the referring URL, where the URL of the lower hierarchical order is hyperlinked to a page of the referring URL; and counting a referred number of times of the referring URL so that a counter is incremented when a client visits a URL of a lower hierarchical order through the referring URL.

20. A computer-readable storage medium including a recorded program for executing an information source monitoring process for use in monitoring access of a specific client computer to an unspecified number of server computers in a network, the server computers having data files having a hyperlink structure, the specific client computer browsing the data files, and the network interconnecting the server computers and the specific client computer, the program comprising:

extracting a referring URL (Uniform Resource Locator) from a request header for a data file wherein the referring URL is of a higher hierarchal level than is a URL of a referred-to hyperlinked page of the request header, the request header outputted to the network from the specific client computer;

storing the extracted referring URL of the higher hierarchal level as reference information, and counting the reference information to find a total number of times reference was made to each referring URL so that the number of references by the URL of the higher hierarchal level is counted and the number of times that a particular URL is used as a referrer to refer a client to other data file(s)/site(s) is counted, and outputting a result of the counting to the specific client computer.

21. The method of claim 20, wherein the counting is for counting the reference information to obtain a total number of times reference is made for each referring URL so that a count value is increased each time a given page is used to link to another or destination linked page.

22. The medium of claim 20, further comprising means for causing reference information storing means to store at least a referring URL as reference information, when the client computer makes an access to a URL of a lower hierarchical order than the referring URL, where the URL of the lower hierarchical order is hyperlinked to a page of the referring URL, and for causing counting means to count a referred number of times of the referring URL stored in said reference information storing means so that a counter is incremented when a client visits a URL of a lower hierarchical order through the referring URL.

* * * * *